US006002480A

United States Patent [19]
Izatt et al.

[11] Patent Number: 6,002,480
[45] Date of Patent: Dec. 14, 1999

[54] DEPTH-RESOLVED SPECTROSCOPIC OPTICAL COHERENCE TOMOGRAPHY

[76] Inventors: Joseph A. Izatt; Manish D. Kulkarni; Michael V. Sivak, all of c/o University Hospitals of Cleveland, Department of Medicine, Division of Gastroenterology, 11100 Euclid Ave., Cleveland, Ohio 44106-5066

[21] Appl. No.: 09/088,519

[22] Filed: Jun. 2, 1998

Related U.S. Application Data

[60] Provisional application No. 60/048,237, Jun. 2, 1997.

[51] Int. Cl.⁶ .................................................. G01B 9/02
[52] U.S. Cl. .......................... 356/345; 356/346; 356/357; 356/360
[58] Field of Search .................................. 356/345, 346, 356/357, 360

[56] References Cited

U.S. PATENT DOCUMENTS

| | | | |
|---|---|---|---|
| 4,063,549 | 12/1977 | Beretsky et al. | 128/2 |
| 5,158,090 | 10/1992 | Waldman et al. | 128/664 |
| 5,200,819 | 4/1993 | Nudelman et al. | 358/98 |
| 5,353,802 | 10/1994 | Ollmar | 128/734 |
| 5,459,570 | 10/1995 | Swanson et al. | 356/345 |
| 5,491,524 | 2/1996 | Hellmuth et al. | 351/212 |
| 5,493,109 | 2/1996 | Wei et al. | 250/201.3 |
| 5,501,226 | 3/1996 | Petersen et al. | 128/691 |
| 5,549,114 | 8/1996 | Petersen et al. | 128/691 |
| 5,565,986 | 10/1996 | Knüttel | 356/346 |
| 5,644,642 | 7/1997 | Kirschbaum | 382/103 |

OTHER PUBLICATIONS

Optical Coherence–Domain Reflectometry: A New Optical Evaluation Technique, R.C. Youngquist et al., *Optics Letters*, vol. 12, No. 3, pp. 158–160 (Mar. 1997).
Optical Coherence Tomography, D. Huang et al., *Science*, vol. 254, pp. 1178–1181 (Nov. 22, 1991).
Systems and Transforms with Applications in Optics, A. Papoulis, pp. 254–293, McGraw–Hill Book Company (1968).
Maximum–Likelihood Deconvolution, A Journey into Model–Based Signal Processing, J.M. Mendel, pp. 1–77, Springer–Verlag New York Inc. (1990).
Micron–Resolution Biomedical Imaging with Optical Coherence Tomography, J. Izatt et al., *Optice & Photonics News* (Oct. 1993).
Time–resolved studies of stimulated emission from colloidal dye solutions, M. Siddique et al., *Optics Letters*, vol. 21, No. 7 (Apr. 1, 1996).
Laser action in polymeric gain media containing scattering particles, R.M. Balachandran et al., *Applied Optics*, vol. 35, No. 4 (Feb. 1, 1996).
Laser action in strongly scattering media, N.M. Lawandy et al., *Nature*, vol. 368 (Mar. 31, 1994).
Three Ways to Implement Interferencial Techniques: Application to Measurements of Chromatic Dispersion, Birefringence, and Nonlinear Susceptibilities, P.L. Francois et al., *Journal of Lightwave Technology*, vol. 7, No. 3 (Mar. 1989).

(List continued on next page.)

*Primary Examiner*—Robert H. Kim
*Assistant Examiner*—Andrew H. Lee
*Attorney, Agent, or Firm*—Thompson Hine & Flory LLP

[57] ABSTRACT

A method is described for determining depth-resolved backscatter characteristics of scatterers within a sample, comprising the steps of: acquiring a plurality of sets of cross-correlation interferogram data using an interferometer having a sample arm with the sample in the sample arm, wherein the sample includes a distribution of scatterers therein, and wherein the acquiring step includes the step of altering the distribution of scatterers within the sample with respect to the sample arm for substantially each acquisition; and averaging, in the Fourier domain, the cross-correlation interferogram data, thereby revealing backscattering characteristics of the scatterers within the sample.

15 Claims, 18 Drawing Sheets

OTHER PUBLICATIONS

Precise characterization of the Raman nonlinearity in benzene using nonlinear interferometry, A. Owyoung et al., *Journal of Applied Physics*, vol. 48, No. 2 (Feb. 1977).

Simultaneous Measurement of Dispersion, Spectrum, and Distance with a Fourier Transform Spectrometer, T. Hellmuth et al., *Journal of Biomedical Optics*, vol. 3, No. 1 (Jan. 1998).

Ultrasonic Tissue Characterization of Uveal Melanoma and Prediction of Patient Survival After Enucleation and Brachytherapy, D.J. Coleman et al., *American Journal of Opthalmology*, 112:682–688 (Dec. 1991).

Correlations of Acoustic Tissue Typing of Malignant Melanoma and Histopathologic Features as a Predictor of Death, D. J. Coleman et al., *American Journal of Opthalmology*, 110:380–388 (Oct. 1990).

Theoretical framework for spectrum analysis in ultrasonic tissue characterization, F.L. Lizzi et al., *J. Acoust. Soc. Am.*, 73 (4) (Apr. 1983).

Spectroscopic optical coherence tomography, M.D. Kulkarni et al., Conference on Lasers and Electro–Optics. vol. 9 1996 Technical Digest Series Conference Edition (Jun. 2–7, 1996)

Diagnostic Spectrum Analysis in Ophthalmology: A Physical Perspective, E.J. Feleppa, *Ultrasound in Med. & Biol*, vol. 12, No. 8 (1986).

Noninvasive Identification of Bladder Cancer with Subsurface Backscattered Light, I.J. Bigio et al., *Progress in Biomedical Optics: Proceedings of Advances in Laser and Light Spectroscopy to Diagnose Cancer and Other Diseases*, Los Angeles, CA (Jan. 23–24, 1994).

Detection of gastrointestinal cancer by elastic scattering and absorption spectroscopies with the Los Alamos Optical Biopsy System, *Progress in Biomedical Optics: Proceedings of Advances in Laser and Light Spectroscopy to Diagnose Cancer and Other Disease II*, San Jose, CA (Feb. 7–8, 1995).

Rapid Near–Infrared Raman Spectroscopy of Human Tissue with a Spectrograph and CCD Detector, J.J. Baraga, *Applied Spectroscopy*, vol. 46, No. 2 (1992).

Theoretical and Experimental Investigations of Elastic Scattering Spectroscopy as a Potential Diagnostic for Tissue Pathologies, J. Boyer et al., *OSA Proceedings on Advances in Optical Imaging and Photon Migration*, vol. 21, Orlando, FL (Mar. 21–23, 1994).

DEPTH-RESOLVED SPECTROSCOPIC OPTICAL COHERENCE TOMOGRAPHY

CROSS REFERENCE TO RELATED APPLICATIONS

This application claims priority under 35 U.S.C. 119 from Provisional Application Ser. No. 60/048,237, filed Jun. 2, 1997, the entire disclosure of which is incorporated herein by reference.

BACKGROUND

Optical imaging of a biological specimen has always been a formidable and challenging task because the complex microscopic structure of tissues causes strong scattering of the incident radiation. Strong scattering in tissue at optical wavelengths is due to particulate scattering from cellular organelles and other microscopic particles, as well as to refractive index variations arising within and between cell and tissue layers.

For over a century, conclusive diagnosis of many diseases of cellular origin (such as cancer) has been performed by the process of excisional biopsy, comprising the identification, removal, histological preparation and optical microscopic examination of suspect tissue samples. Many developments have taken place to aid the pathologist in interpretation of histological microstructure, primarily the development of a wide variety of histochemical stains specific to the biochemistry of tissue microstructures. This technique provides sufficient resolution to visualize individual cells within the framework of the surrounding gross tissue structure. In the last several years, a revolution has been stimulated in the field of ultra-high resolution microscopy for biomedical applications. Ultra-high resolution microscopy allows visualization of sub-cellular and sub-nuclear structures. This has resulted in the invention of tools for high resolution optical imaging, including near field scanning microscopy, standing wave fluorescence microscopy, and digital deconvolution microscopy.

These technologies are primarily designed for imaging features at or near the surface of materials. Inhomogeneties of the refractive indices inside a biological specimen leading to multiple scattering limit the probing depth of these techniques. Thus, considerable effort is required to cut and preserve the samples in order to prepare the specimen to the requirements of the microscope. In medical applications, this means that suspect tissue sites identified using minimally invasive diagnostic technologies such as endoscopy must still be acquired and processed via routine histological examination. This step introduces significant delay and expense.

The invention of confocal microscopy and its advanced development in the past few years have provided the researcher the capability to study biological specimens including living organisms without the need for tissue resection and histological processing. However, the presence of multiple scattering in samples limits confocal microscopy to specimens which are thin and mostly transparent. There is a need, therefore, for new optical methods capable of in vivo imaging deeper inside highly scattering tissues and other biological specimens.

Optical coherence tomography ("OCT") is a technology that allows for noninvasive, cross-sectional optical imaging in biological media with high spatial resolution and high sensitivity. OCT is an extension of low coherence or white-light interferometry, in which a low temporal coherence light source is utilized to obtain precise localization of reflections internal to a probed structure along an optic axis (i.e., as a function of depth into the sample). In OCT, this technique is extended to enable scanning of the probe beam in a direction perpendicular to the optical axis, building up a two-dimensional reflectivity data set, used to create a cross-sectional, gray-scale or false-color image of internal tissue backscatter.

Many studies have suggested the use of elastic backscatter or reflectance as a noninvasive diagnostic tool for early detection of several human diseases, including cancer. The use of backscattered light is based on the fact that many tissue pathologies are accompanied by architectural changes at the cellular and sub-cellular level, for example the increase in the nuclear to cytoplasmic volume ratio accompanying neoplastic conversion. In the near infra-red (NIR) zone, the elastic scattering properties of the tissue are most strongly affected by changes in tissue features whose dimensions are on the same order as the NIR wavelength. Preliminary success in diagnosing cancer in the bladder, skin, and gastrointestinal tissues has been reported with techniques based on elastic backscatter spectroscopy. However, currently implemented spectroscopic systems do not incorporate depth resolution and thus cannot provide information on the degree of infiltration or cancer staging. Although elastic backscatter spectra can be collected with confocal techniques, the turbidity of biological samples in combination with the point spread function of confocal microscopes limit the penetration depth for acquiring spatially selective spectra to no greater than a few hundred micrometers in most tissues. Many tissue samples have features of interest located at a depth more than that can be probed by confocal techniques, but less than that of other sub-surface imaging modalities such as ultrasound. Accordingly, there is a need for a spectroscopy system that is capable of obtaining depth-resolved elastic backscatter spectra from a sample.

Inelastic scattering processes including fluorescence and Raman spectroscopy have also been exploited for noninvasive disease diagnosis. Unlike elastic scattering events, in which the incident and scattered radiation are at the same frequency, in inelastic scattering events all or part of the incident optical energy is temporarily absorbed by the atoms and/or molecules of the subject tissue, before being remitted at a different (usually lower) optical frequency. Thus, inelastic scattering processes serve as intimate probes of tissue biochemistry. Several studies have reported on laser-induced fluorescence spectroscopy as a potential early cancer diagnostic in the skin, breast, respiratory, gastrointestinal, and urogential tracts. Additional studies have reported on the more biochemically specific Raman spectroscopy for characterization of atherosclerotic lesions in the coronary arteries, as well as for early cancer detection in the gastrointestinal tract and cervix. In all studies of fluorescence, Raman, and other inelastic scattering spectroscopies in human tissues to date, means have not been available to resolve the depth of the scattered signal with micrometer-scale resolution. There is thus a need for a spectroscopy system capable of obtaining depth-resolved inelastic backscatter spectra as well as elastic backscatter spectra from a sample, such as could be obtained by extending Optical Coherence Tomography to detect inelastically scattered light. The depth resolved elastic and inelastic backscattering spectroscopic information could aid in the detection of the shapes and sizes of lesions in an affected organ and could thus assist in accurate staging of diseases such as cancer.

The inelastic scattering spectroscopies based on spontaneous fluorescence and spontaneous Raman scattering which have been used in medical diagnostic applications to date are not suitable for combination with Optical Coherence Tomography because they are incoherent scattering processes, and thus the scattered light would not be detected with OCT. However, coherent inelastic scattering processes do exist, in particular the process of stimulated emission is the coherent analog of spontaneous emission, and stimulated Raman scattering is the coherence analog of spontaneous Raman scattering. Other stimulated coherent scattering processes also occur which may find future application in medical diagnostics, for example coherent anti-Stokes Raman scattering (CARS) and four-wave mixing (FWM). All of these coherent inelastic scattering processes require the presence of pump energy which is converted into signal energy in a coherent gain process. Thus, by virtue of their coherence, stimulated coherent gain processes are suitable for combination with Optical Coherence Tomography to allow for depth resolution of the location of the inelastic scattering events. Therefore, there exists a need for a system which allows for this combination.

SUMMARY

The present invention provides a technique for depth-resolved coherent backscatter spectroscopy. This technique is an extension of OCT technology. U.S. patent application Ser. No. 09/040,128, filed Mar. 17, 1998, the disclosure of which is incorporated herein by reference, describes an improved OCT system that utilizes a transfer function model, where the impulse response is interpreted as a description of actual locations of reflecting and scattering sites within the tissue. Estimation of the impulse response provides the true axial complex reflectivity profile of the sample with the equivalent of femtosecond ranging resolution. An interferogram obtained having the sample replaced with a mirror, is the auto-correlation function of the source optical waveform. The interferogram obtained with the tissue in the sample is the measured output of the system and is known as the cross-correlation function. By deconvolving an impulse response profile from the output interferometric signal, a more accurate description of the tissue sample is obtained.

This model assists in calculating the spectral characteristics of optical elements over the bandwidth of the source by analysis of the interference resulting from internal tissue reflections. This model may also be extended to spectrally analyze light backscattered from particles in turbid media. Because individual scatterers in a turbid specimen may be considered as being essentially randomly distributed in space, the ensemble average of transfer functions obtained from cross-correlation data windowed to a specific region within the sample reveals the backscattering characteristics of the scatterers localized to that region. From this model, it is determined that the squared magnitude of the frequency domain transfer function correlates with the backscatter spectrum of scatterers.

Accordingly, the present invention provides a system or method for determining depth resolved backscatter characteristics of scatterers within a sample which includes the means for, or step of averaging (in the Fourier domain) the interferogram data obtained over a region of the sample.

In one embodiment of the present invention, the system or method includes the means for, or steps of: (a) acquiring auto-correlation interferogram data from the Low-Coherence interferometer; (b) acquiring multiple sets of cross-correlation interferogram data from the Low-Coherence interferometer having the sample under analysis in the sample arm, where the distribution of scatterers within the sample has been altered for each acquisition (e.g., by squeezing or stretching the tissue sample) or where the sample arm is repositioned slightly for each acquisition; (c) obtaining an auto-power spectrum by performing a Fourier transform on auto-correlation data; (d) obtaining a cross-power spectrum for the windowed portion of each cross-correlation data by performing a Fourier transform on the windowed portion of each cross-correlation data set; (e) obtaining a transfer function from the ratio of each cross-power spectrum to the auto-power spectrum; (f) squaring each transfer function obtained in step (e) and (g) averaging the magnitude of the squared transfer functions to reveal backscattering characteristics of scatterers resident within that window.

Based upon the model described above, any form of coherent spectroscopy can be performed in a depth-resolved manner. Accordingly, the present invention also provides a system and method for performing stimulated-emission spectroscopic optical coherence tomography (SE-SPOCT). Such a system or method includes the means for, or steps of directing an intense pump laser at the appropriate frequency to induce depth- and frequency-dependent gain in the sample volume interrogated. The depth resolved spectrum obtained according to the steps discussed above will thus contain features corresponding to the frequency-dependent round-trip gain experienced by the OCT source radiation (inelastic backscattering characteristics of the scatterers resident within the window). In a detailed embodiment of SE-SPOCT, the pump laser is cycled on and off and gated detection is performed to separate the elastic backscattering characteristics from the inelastic backscattering characteristics. Additionally, the pump laser may be modulated at a certain frequency and gated detection is performed to separate the elastic backscattering characteristics from the inelastic backscattering characteristics.

Similar to SE-SPOCT, the present invention also provides a system or method for performing stimulated Raman scattering spectroscopic OCT (SRS-SPOCT). In this embodiment, the system or method includes the means for, or the step of directing a high intensity pump light into the sample interaction region. The depth resolved spectrum obtained according to the steps discussed above will thus contain localized peaks in the depth-resolved backscatter spectrum that provide substantial vibrational/rotational spectral information of the scatterers within the sample.

Accordingly, it is an object of the present invention to provide a system and method for acquiring depth-resolved backscatter spectra of a sample, utilizing OCT. It is a further object of the present invention to provide a system and method for performing stimulated-emission spectroscopic OCT. And it is a further objective of the present invention to provide a system or method for performing stimulated Raman scattering spectroscopic OCT. These and other objects and advantages of the present invention will be apparent from the following description, the attached drawings and the appended claims.

BRIEF DESCRIPTION OF THE DRAWINGS

FIG. 11c illustrates a modification of the systems of FIGS. 11a and 11b;

FIG. 13 is an illustration of the operation of the alternate embodiments of FIGS. 11a, 11b, and 12a;

FIG. 14a is a schematic block diagram representation of a system for gated or synchronous detectection for use with the embodiments of FIGS. 11a, 11b, and 12a;

FIG. 14b is timing diagram representing the operation of the system of FIG. 14a;

FIG. 15a is a schematic block diagram representation of another system for gated or synchronous detection for use with the embodiments of FIGS. 11a, 11b, and 12a; and FIG. 15b is a timing diagram representing the operation of the system of FIG. 15a.

DETAILED DESCRIPTION

I. Michelson Interferometer

Figure 1:
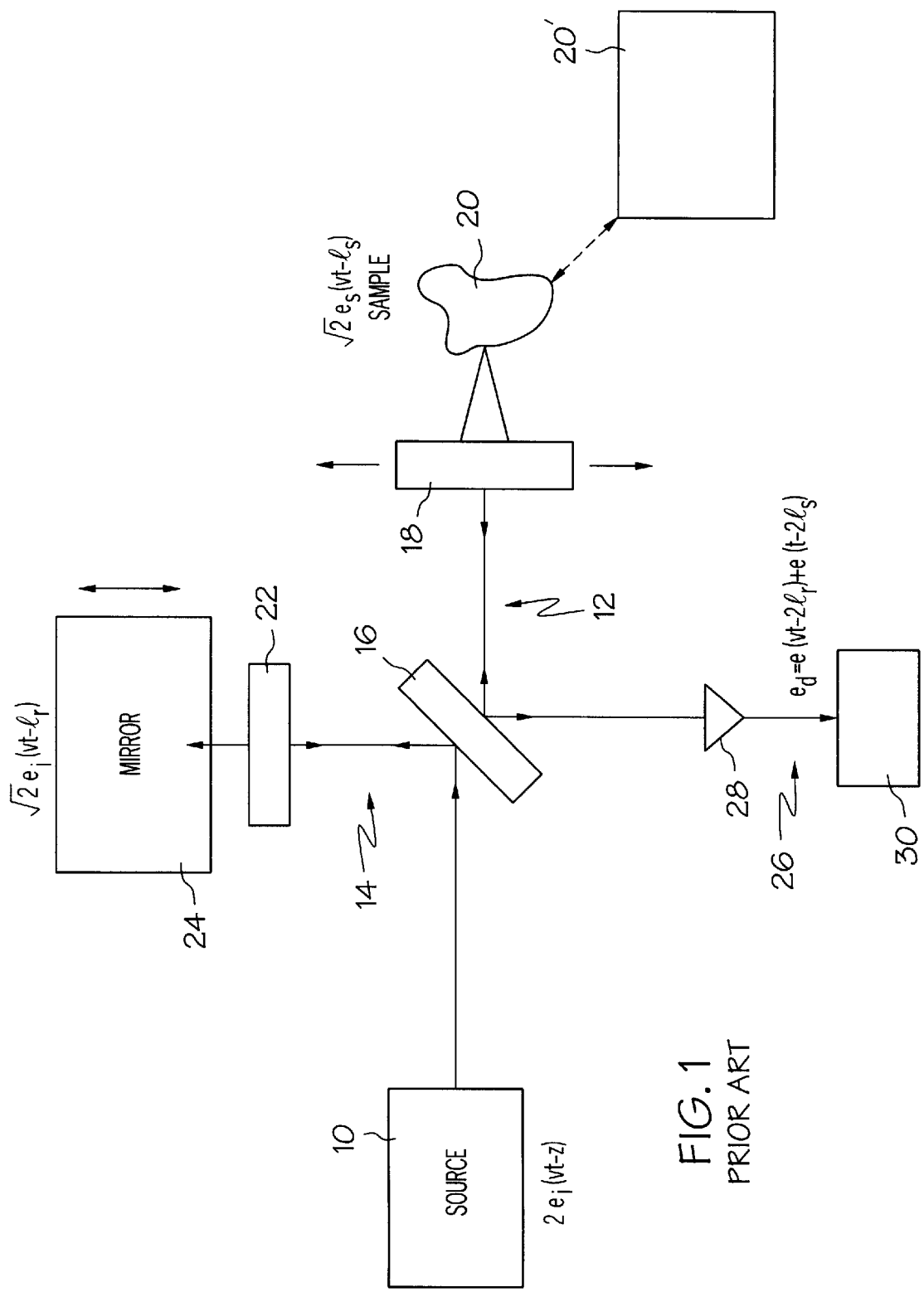
FIG. 1 is a block-diagram representation of a conventional Michelson interferometer.
Figure 2:
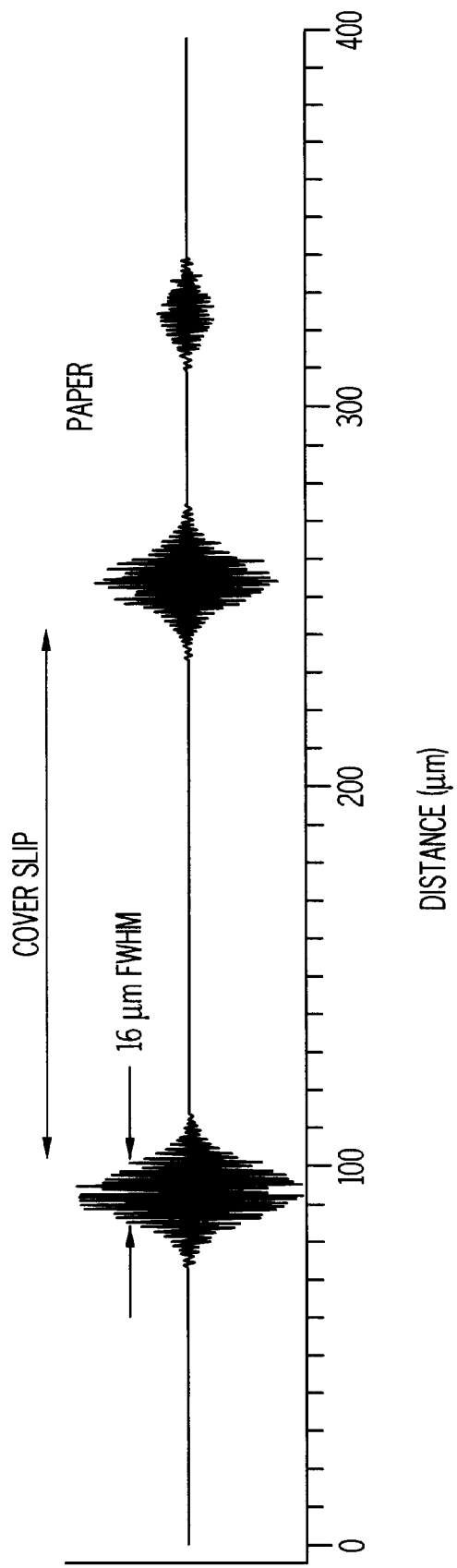
FIG. 2 is an interferogram of a cover slip placed on a piece of paper taken by the Michelson interferometer of FIG. 1.

As shown in FIG. 1, a conventional scanning Michelson interferometer can be utilized to obtain the depth resolved measurements of reflectors and scatterers in a sample. A low coherence light source 10 is separated into two beams by a 50/50 beam splitter 16, fifty percent of the light power is transmitted to a sample arm 12 and the remaining fifty percent is directed to a reference arm 14. The sample arm 12 includes a sample probe 18, which focuses the sample beam into the sample 20 and collects the retroreflected light from the sample. The reference arm 14 includes a reference probe 22 which transmits the reference beam onto a retroreflecting mirror 24, translating towards or away from the reference probe, and collects the light retroreflected back from the mirror 24. The retroreflected beams from the sample 20 and mirror 24 are combined again in the beam splitter 16 into a detected electric field 26, which is directed to the optical detector 28. Because a low coherence light source 10 is used, an interferometric signal is produced at the detector 28 when the sample probe path distance to a reflecting or scattering site within the sample 20 matches the reference arm length, to within a source coherence length. For every reflecting or scattering site within the sample, a fringe pattern will appear in the interferometric signal similar to that as shown in FIG. 2. The axial profiles of backscatter versus depth are measured by translating the reference mirror 24 and by synchronously recording the envelope of the interferometric signal at the detector 28. This profile is known as the OCT A-scan of the sample. Two dimensional cross-sectional imaging of the sample is performed by laterally scanning the sample probe 18 during successive A-scans. The resulting data set is processed in a computer 30 and displayed as a gray scale or false color image. A series of two-dimensional images can be acquired by scanning the probe beam perpendicular to the direction of lateral scanning. The series of two-dimensional images can then be rendered into a three dimensional display or a pseudo three dimensional display in gray scale or false color.

Those of ordinary skill in the art will recognize that, although it is preferred to scan the sample probe 18 with respect to the sample 20, the sample may also be scanned with respect to a stationary sample probe. It also to be understood, that for the purposes of this disclosure, the term "optical" is to pertain to all ranges of electromagnetic radiation, and preferably pertains to the range of 100 nanometers to 30,000 nanometers.

In developing the present invention, a unique transfer function model has been developed for OCT interaction with the sample, where the impulse response is interpreted as a description of the actual locations of the reflecting and scattering sites within the sample. Based upon this model, the transfer function of the system can be calculated from the source auto-power spectrum and the cross-power spectrum of the electric fields in the reference and sample arms. The estimation of the impulse response from the transfer function provides the true axial complex reflectivity profile of the sample with the equivalent of femtosecond temporal resolution. Extending this model, it is determined that the squared magnitude of the frequency domain transfer function correlates with the backscatter spectrum of scatterers within the sample. In particular, because individual scatterers in a turbid specimen are randomly distributed in space, the ensemble average of transfer functions obtained from cross-correlation data windowed to a specific region within the sample reveals the backscattering characteristics of the scatterers localized to that region.

II. Model for Low Coherence Interferometry in Thick Scattering Media

The present invention is based on a systems theory model which treats the interaction of the low coherence interferometer with the specimen as a linear shift invariant (LSI) system. For the scan lengths of a few mm, typical of OCT imaging, it is assumed that group velocity dispersion is negligible and the group and phase velocities are equal. In the NIR region absorption causes negligible attenuation as compared to the attenuation due to multiple scattering within tissues. This model does not take into account the attenuation of light due to multiple scattering as well as absorption.

An optical wave with an electric field with space and time dependence expressed in scalar form as $2\dot{e}_i(t, z)$ is assumed to be incident on a Michelson interferometer, as illustrated in FIG. 1. An arbitrary scaling factor of 2 has been introduced for the sake of convenience. The electric field can be expressed as $2\tilde{e}_i(t, z) = 2e_{0i}(t, z)\cos(2\pi f_0 t - k_0 z + \phi(t, z))$ where $f_0$ is the central frequency of the source spectrum and $k_0(=2p/l_0)$ is the corresponding wave number. $l_0$ is the corresponding center wavelength. Here t and z indicate the time and distance traveled by the wave, respectively. $2e_{0i}(t, z)$ and $\phi(z,t)$ are the time and space dependent amplitude and phase of the wave. The analytic signal representation of this electric field is given by $2e_{0i}(t, z)\exp[j(2\pi f_0 t - k_0 z + \phi(t, z))]$ where $j=\sqrt{(-1)}$. In most cases we will use this complex analytic representation to denote even those quantities that are real for simplicity. The quantity $2e_i(t, z) = 2e_{0i}(t, z)\exp[j\phi(t, z)]$ is known as the complex envelope of the signal. We can write the term $2pf_0 t - k_0 z$ as $k_0(vt - z)$ where v is the group velocity at the source center frequency. Here we assume that the group and phase velocities are equal. We assume that the complex envelope is varying much slowly on the scale of the source wavelength. We further require the complex envelope to be a function of (vt-z). Thus it is denoted by $2e_i(vt-z) = 2e_{0i}(vt-z)\exp[j\phi(vt-z)]$. All the temporal dependence is expressed in terms of a path delay and thus electric fields can be treated as pure functions of space. Apart from the center frequency, all the information about the wave can be derived from this complex envelope. Therefore we will use the term electric field to denote the field $\tilde{e}$ itself as well as its complex envelope e. In the case when the group and phase velocities are unequal, $\tilde{e}(vt-z) = 2e_{0i}(vt-z)\exp[j\phi(vt-z)]\exp(jk_0(ct-z))$, where c is the phase velocity. This analysis will still be applicable. At the 50/50 beamsplitter, half the power gets coupled into the reference arm and the rest into the sample arm. Since the power is proportional to the square of the electric field, the electric field at the beam splitter in the reference arm is given by $\sqrt{2}e_i(vt)$, setting z=0 at the beamsplitter. The lightwave reaching the reference mirror assumes the form $\sqrt{2}e_i(vt-l_r)$, where $l_r$ and $l_s$ are the optical path lengths in the reference and sample arms, respectively. If the mirror is ideal, it will reflect back the same electric field. Then the field returning to the beam splitter is indicated as $\sqrt{2}e_i(vt-2l_r)$. $\sqrt{2}e_i(vt-l_s)$ is the field reaching the sample. In the sample arm, the light interacts with the specimen and the backscattered field is given by $\sqrt{2}e_s(vt-l_s)$. The backscattered field reaching the beam splitter takes the form $\sqrt{2}e_s(vt-2l_s)$.

The fields returning from the reference and sample arms again get separated 50/50 into the arms consisting of the source and detector. Therefore the interference of $\tilde{e}_i(vt-2l_r)$ and $\tilde{e}_s(vt-2l_s)$ is incident on the detector. The reference arm length can be varied by various means. One such method is mechanically scanning the reference mirror causing sweeping of the reference arm length $l_r$. Since the detector response time (e.g., nanosecond to microsecond for typical optical receivers) is much longer than the optical wave period ($\sim 10^{-15}$ second) the photocurrent generated by a square law detector is proportional to $$i_d \sim \tilde{R}_{is}(\Delta l) = \langle \tilde{e}_i(vt)\tilde{e}_s^*(vt+\Delta l) \rangle \quad \text{(a1)}$$

The superscript * indicates a complex conjugate. An interferogram obtained having the sample replaced with a mirror in the sample arm, is the "auto-correlation function" $\tilde{R}_{ii}(\Delta l)$. The tissue is modeled as an LSI system. The "auto-correlation function" $\tilde{R}_{ii}(\Delta l)$ of the source optical wave form is treated as an input to the LSI system. The interferogram obtained with the sample in the sample arm is the measured output of the LSI system, known as the "cross-correlation function" $\tilde{R}_{is}(\Delta l)$. The cross- and auto-correlation functions are expressed as:

$$\tilde{R}_{is}(\Delta l) = \langle \tilde{e}_i(vt)\tilde{e}_s^*(vt+\alpha l) \rangle, \tilde{R}_{ii}(\Delta l) = \langle \tilde{e}_i(vt)\tilde{e}_i^*(vt+\Delta l) \rangle \quad \text{(a2)}$$

Note that $\tilde{R}_{ii}(\Delta l)$, and $\tilde{R}_{is}(\Delta l)$ are the complex analytic representations of the signals measured, i.e., only the real parts of $\tilde{R}_{ii}(\Delta l)$, and $\tilde{R}_{is}(\Delta l)$ are actually measured.

We represent the optical field interaction with the LSI sample as a transfer function $\tilde{H}(k)$ (where k is wavenumber) whose inverse Fourier transform is the impulse response $\tilde{h}(z)$:

$$\tilde{e}_s(-Z) = \tilde{e}_i(-z) \otimes \tilde{h}^*(z) \quad \text{(b)}$$

where $\otimes$ represents convolution. Note that shift invariance allows omission of the terms vt in this expression. The convolution theorem leads to $$\tilde{E}_s(k) = \tilde{E}_i(k)\tilde{H}^*(k) \quad \text{(c)}$$

where $\tilde{E}_s(k)$, $\tilde{E}_i(k)$, and $\tilde{H}(k)$ are the Fourier transforms of $\tilde{e}_s(z)$, $\tilde{e}_i(z)$, and $\tilde{h}(z)$, respectively. $\tilde{H}(k)$ is the system transfer function. The LSI assumption provides:

$$\tilde{e}_s(vt-2l_s) = \tilde{e}_i(vt-2l_s) \otimes \tilde{h}^*(-(vt-2l_s)) \quad \text{(d)}$$

Inserting Eq. (d) in Eq. (a) leads to $$\tilde{R}_{is}(\Delta l) = \tilde{R}_{ii}(\Delta l) \otimes \tilde{h}(\Delta l), \tilde{S}(k) = \tilde{S}_{ii}(k)\tilde{H}(k) \quad \text{(e)}$$
$$\Rightarrow \tilde{H}(k) = \tilde{S}_{is}(k)\tilde{S}_{ii}(k) \quad \text{(f)}$$

Note that according to the Wiener-Khinchin theorem, Fourier transforming the autocorrelation and cross-correlation functions gives us $\tilde{S}_{is}(k)$ and $\tilde{S}_{ii}(k)$, respectively. $\tilde{S}_{is}(k)$ and $\tilde{S}_{ii}(k)$ are the auto-power and cross-power spectral densities, respectively.

This analysis will be useful when raw interferograms are measured. It is convenient to measure the complex envelopes of the interferometric data by demodulating $\tilde{R}_{ii}(\Delta l)$, and $\tilde{R}_{is}(\Delta l)$. Such a demodulation assists in noise reduction which otherwise needs to be achieved by using a band-pass filter with sharp cutoffs. Demodulation also allows use of lower sampling frequency while digitizing the data. $R_{ii}(Dl)$ and $R_{is}(Dl)$ are complex envelopes of $\tilde{R}_{ii}(\Delta l)$ and $\tilde{R}_{is}(\Delta l)$, respectively. Thus $R_{ii}(Dl)$ and $R_{is}(Dl)$ will be measured after coherent demodulation. Note that $|R_{ii}(Dl)|$ and $|R_{is}(Dl)|$ will be measured after incoherent demodulation.

$R_{is}(Dl)$ is obtained by coherently demodulating $\tilde{R}_{is}(\Delta l)$ at the center wavenumber $k_0$. Note that when implemented in hardware, the demodulation frequency needs to be specified in terms of the temporal frequency of the detector current. The center frequency of the detector current is $$f_r = V_\phi \frac{k_0}{2\pi}$$

which is same as a Doppler shift frequency on the reference arm light. $V_\phi$ is the scan rate of optical phase delay. $V_\phi = 2V_r$ for a simple mechanical reference mirror translator. The demodulation frequency can be chosen to be equal to $f_r$ for demodulating the detector current to obtain $R_{is}(Dl)$ and $R_{ii}(Dl)$.

Therefore let's analyze the system using complex envelopes of the electric fields and the impulse response. We represent the optical field complex envelope interaction with the LSI sample as a transfer function H(k) (where k is wavenumber) whose inverse Fourier transform is the impulse response h(z):

$$\sqrt{2}e_s(z) = \sqrt{2}e_i(z) \otimes h^*(-z) \text{ and } \sqrt{2}E_s(k) = \sqrt{2}E_i(k)H^*(k) \quad \text{(1a)}$$

where ⊗ represents the convolution operation. $E_s(k)$ and $E_i(k)$ are Fourier transforms of $e_s(z)$ and $e_i(z)$, respectively. Note that $\tilde{h}(vt-z)=h(vt-z)\exp[j(k_0(vt-z)]$ and $\tilde{H}(k)=H(k+k_0)$. Also the LSI assumption leads to $$\sqrt{2}e_s(vt-l_s)=\sqrt{2}e_i(vt-l_s)\otimes \tilde{h}(-(vt-l_s)). \tag{1b}$$

The fields returning from the reference and sample arms again get separated 50/50 into the arms consisting of the source and detector. Therefore the interference of $\tilde{e}_i$ $(vt-2l_r)$ and $\tilde{e}_s$ $(vt-2l_s)$ is incident on the detector. The reference arm length can be varied by various means. One such method is mechanically scanning the reference mirror causing sweeping of the reference arm length $l_r$. Since the detector response time (e.g., nanosecond to microsecond for typical optical receivers) is much longer than the optical wave period (~$10^{-15}$ second) the complex envelope of the photocurrent generated by a square law detector is proportional to $$i_D \sim <[e_i(vt-2l_r)+e_s(vt-2l_s)][e_i(vt-2l_s)+e_s vt-2l_s)]^*>, = <[e_i(vt)+e_s(vt+D_l)][e_i(vt)+e_s(vt+D_l)]^*>, \tag{2}$$

where <> denotes integrating over the detector response time which is long compared to the electric field period, and $2(l_s-l_r)=D_l$ is the round trip optical path length difference. When the reference arm length is scanned at a constant velocity, after filtering out the dc components, the time varying components of Eq. 2 reduce to $$i_D \sim R_{is}(\Delta l) = <e_i(vt)e_s(+\Delta l)> \tag{3}$$

which is just the cross-correlation between the complex envelopes of the fields returning from the reference and sample arms. $i_D$ is the complex envelope of the corresponding current at the photoreceiver output. We can also obtain the autocorrelation function of the source field $R_{ii}(Dl)$ by performing the same operation with a mirror in the sample arm, in which case $h(z)=d(z)$ and $e_s(z)=e_i(z) \Rightarrow R_{ii}(\Delta l)=<e_i(vt)e_i^*(vt)+\Delta l)>$. For an optical source with a well characterized spectrum, the form of the autocorrelation function $R_{ii}(Dl)$ is calculated explicitly by computing the inverse Fourier transform of the power spectral density. For a superluminescent diode source approximated by a Gaussian power spectrum, we obtain $$\text{Real part of } \tilde{R}_{ii}(\Delta l) \sim |e_{0i}|^2 \exp\left[-\left(\frac{\Delta l}{l_c}\right)^2 \ln 2\right] \cdot \cos(k_0 Dl); \tag{4}$$

$$l_c = 4(\ln 2)/(Dk)$$

where $k_0$ is the central wavenumber of the source and $D_k$ is the FWHM spectral width. The envelope of the detected signal (plotted as a function of $(l^s-l_r)$) from a reflection in the sample arm is a Gaussian function centered at zero reference arm delay and with a FWHM width equal to the coherence length $l_c$. Substituting Eq. 1 in Eq. 3 results in $$R_{is}(Dl)=R_{ii}(Dl)\otimes h(Dl). \tag{5}$$

According to the Wiener-Khinchin theorem, Fourier transforming the autocorrelation and cross-correlation functions gives us $S_{ii}(k)$ and $S_{is}(k)$. $S_{ii}(k)$ and $S_{is}(k)$ are the auto-power and cross-power spectral densities, respectively. We form an estimate of the transfer function $H(k)$ in an arbitrary turbid sample which may contain many closely spaced reflections by Fourier transforming both sides of Eq. 5:

$$S_{is}(k)=S_{ii}(k)H(k), \quad H(k)=S_{is}(k)/S_{ii}(k). \quad h(z)\longleftrightarrow H(k) \tag{6}$$

where a Fourier transform pair is related by $\longleftrightarrow$.

In practice, the correlation functions defined in Eq. a1, a2 and 3 are hard to measure. The measured (or estimated) correlation functions are influenced by the properties of the optical elements, the measurement electronics, and data acquisition systems, and various noise sources. Therefore what we measure are "estimates" of $\tilde{R}_{ii}$ ($\Delta l$)(or $R_{ii}(\Delta l)$) and $\tilde{R}_{is}(\Delta l)$(or $R_{is}(\Delta l)$). However, for the description of depth resolved spectroscopy systems and claims we will still use the symbols $\tilde{R}_{ii}(\Delta l)$(or $R_{ii}(\Delta l)$) and $\tilde{R}_{is}(\Delta l)$(or $R_{is}(\Delta l)$) to indicate the "estimates" of auto-correlation and cross-correlation functions, respectively. For the purposes of clarity, the terms "auto-correlation and cross-correlation functions" may be used for the terms, "the estimates of auto-correlation and cross-correlation functions" in describing the present inventions.

Similarly the measured (or estimated) power spectra are influenced by the properties of the optical elements, the measurement electronics, and data acquisition systems, and various noise sources. Therefore what we measure are "estimates" of $\tilde{S}_{ii}(k)$ (or $S_{ii}(k)$) and $\tilde{S}_{is}(k)$ (or $S_{is}(k)$). However, for the description of spectroscopy algorithms and claims we will still use the symbols $\tilde{S}_{ii}(k)$ (or $S_{ii}(k)$) and $\tilde{S}_{is}(k)$ (or $S_{is}(k)$), to indicate the "estimates" of auto-power and cross-power spectra, respectively. For the purposes of clarity, the terms "auto-power and cross-power spectra" may be used for the terms, "the estimates of auto-power and cross-power spectra" in describing the present inventions.

While we describe the specific case of a device which uses infra-red light source, the spectroscopy procedure is applicable to any interferometric device illuminated by any electromagnetic radiation source.

In Eqs. b, c, 1a, 1b, and 5 we describe the light-specimen interaction as a linear shift invariant system. We describe the deconvolution methods based on Eqs. e,f, and 6. It should be apparent to a person skilled in the art that the interaction described by Eqs. b, c, e,f, 1a, 1b, 5, and 6 can be exploited by many other methods in space/time domain as well as frequency domain including iterative deconvolution methods, etc. This model also forms the basis of "blind" deconvolution methods which do not use a priori information about the auto-correlation function but assume that it convolves with the impulse response.

The true transfer function $H(k)$ is rarely estimated or measured. In most practical cases, what we get is an "estimate" of the transfer function which is different than the true transfer function. One can obtain this estimate in various ways. One such method is taking the ratio of cross-power spectrum and the auto-power spectrum and taking the complex conjugate of the ratio.

Next we interpret the impulse response $h(z)$ and the transfer function $H(k)$. All information regarding the spatially varying and frequency dependent complex reflectivity of the sample is contained in the space domain function $h(z)$. The interpretation for deconvolution is an approximation of that for spectroscopy. In the case of deconvolution, we model tissue as a body having several layers of materials possessing different refractive indices. The impulse response can be interpreted as a description of the actual locations and reflectivities of reflecting sites within the sample arising from index of refraction inhomogeneities. The impulse response takes a form of a series of spikes (i.e., delta functions) which are located at the reflection sites while dealing with discrete data. These spikes have heights equal to the electric field reflectivities at these sites within the tissue. This information is available over a length L within the tissue where L is the reference mirror scan length.

In order to describe the impulse response quantitatively, it is convenient to deal with discrete representations of the impulse response and crosscorrelation function. It will also be helpful to do so since we measure quantized values of the discrete representations of cross-correlation functions using a computer. We assume that M samples of $R_{is}(Dl)$ are acquired over a length L. Suppose $\Delta z$ is the sampling interval. The numbers $$R_{is}(1), R_{is}(2), \ldots, R_{is}(n), \ldots, R_{is}(M)$$

denote M measurements of a cross-correlation function sampled at distances $\Delta z, 2\Delta z, 3\Delta z, \ldots$ This implies that $$R_{is}(n) = R_{ii}(n) \otimes h/(n). \quad (7)$$

$R_{ii}(n)$ and $h(n)$ are discrete representations of the autocorrelation function and the target impulse response, respectively. Now, as discussed earlier, $h(n)$ assumes a form of a series of spikes (i.e., discrete delta functions) which are located at the reflection sites. In a tissue sample, one usually does not find a reflection site at every sample. Therefore the probability of occurrence of an interface at a sample is much less than one. A random sequence of zeros and ones is known as a Bernoulli sequence. If the adjacent elements in such a sequence are completely unrelated, then such a sequence is known as a white sequence (since the power spectrum of such a sequence is white). We could possibly represent the impulse response by a Bernoulli event sequence $b(n)$. The sequence provides a one every time an interface occurs and a zero in the absence of a reflector at the sample point. However, the amplitude of the reflectivity is not constant and fluctuates randomly due to refractive index inhomogeneities and hence we need to multiply this sequence by a Gaussian random number generator $g(n)$. $g(n)$ is also a white sequence. Therefore $$h(n) = b(n)g(n). \quad (8)$$

This essentially means that when at every point in $b(n)$ a one occurs (i.e., a reflection site occurs), we turn on our Gaussian random number generator and replace the one by the output of the generator. The value of this random number represents the reflectivity at that point. If the reflectivities are complex, one can generate a complex Gaussian random number. We are assuming that all reflections occur at the interfaces and the effects of point scatterers do not interfere with the process of impulse response estimation.

In order to perform spatially resolved spectroscopy, a more complicated interpretation of the transfer function is required. For a monochromatic wave with an amplitude of one and zero initial phase incident on a reflector, the reflected field $\tilde{e}_s$ is related to the incident field by the relation, $$\tilde{e}_i = \exp[jk(vt-z)], \; \tilde{e}_s = \tilde{H}(k)\tilde{e}_i = \tilde{H}(k)\exp[jk(vt-z)] \quad (9)$$

where $\tilde{H}(k)$ is the reflection coefficient (i.e., backscattering coefficient) at a wavenumber k. $\tilde{H}(k)$ is real for many particles. Then $|\tilde{H}(k)|^2$ is the intensity reflectivity (i.e., backscattering cross-section) at a wavenumber k. If a monochromatic beam of light is incident on a group of identical particles located at the same depth, the effective $\tilde{H}(k)$ would just get scaled by the number of scatterers due to coherent addition of the scattered waves. However, if they are situated at different depths, then the reflections from all the scatterers would add coherently (i.e., interfere) and the impulse response would be complex because of phase delays occurred due to different depths of the particles. Therefore the effective $\tilde{H}(k)$ would also be complex. A similar phenomenon would occur if the particles were dissimilar from each other. In both cases $|\tilde{H}(k)|^2$ would represent effective backscattering cross-section of the scatterers at a wavenumber k. We prove that $|\tilde{H}(k)|^2$ is related to the weighted average of the reflectivities of heterogeneous scatterers. If a low-coherence light source is used, the reflections from only those scatterers located within a few coherence lengths would add coherently. In that case $|\tilde{H}(k)|^2$ relates to the weighted average of the backscatter spectra of these non-homogenous scatterers.

Let us examine the complex envelope $h(n)$ quantitatively. For a homogeneous medium, we can write $$h(n) = b(n) \otimes c(n) \quad (10)$$

where $b(n)$ is a Bernoulli sequence as discussed earlier and $c(n)$ is the inverse Fourier transform of $C(k)$. $C(k)$ denotes spectrally dependent electric field backscattering coefficient of the scatterers. We call $c(n)$ as the specific impulse response of a single scatterer. Thus the frequency dependent backscattering cross-section of particles is represented by $|C(k)|^2$. The Fourier transform of $b(n)$ is given by $B(k)$ and $E\{|B(k)|^2\}$ represents the expectation value (i.e., the statistical average) of $|B(k)|^2$ and is equivalent to the power spectral density of the Bernoulli sequence. For a white sequence, this can be assumed to be equal to a constant (in this case can be assumed to be 1 for simplicity) for all wavenumbers. Fourier transforming both sides of Eq. 10 provides $$\tilde{H}(k) = B(k)C(k). \quad (11)$$

Taking magnitude square of both sides gives, $$|\tilde{H}(k)|^2 = |B(k)|^2 |C(k)|^2. \quad (12)$$

Obtaining ensemble averages on both sides yields, $$E\{|\tilde{H}(k)|^2\} = E\{|B(k)|^2 |C(k)|^2\}. \quad (13)$$

Since $C(k)$ is not a randomly varying function, we get $$E\{|H(k)|^2\} = E\{|B(k)|^2\}|C(k)|^2 = 1 \cdot |C(k)|^2 = C(k)|^2. \quad (14)$$

Thus averaging several measurements of $|H(k)|^2$ over a volume cell of interest can provide the backscatter spectrum of the individual particles localized within the homogeneous medium. While computing the spectra of scatterers located deep inside a specimen, one should note that $C(k)$ has the information regarding the backscatter spectrum of scatterers as well as round-trip spectral filtering due to the intervening medium.

Now as indicated in Eq.(c), $\tilde{H}(k)$ is the quantity that actually interacts with the electric field. Using $$\tilde{H}(k) = H(k+k_0) \text{ and } \tilde{C}(k) = C(k+k_0), \quad (14a)$$

$$E\{|\tilde{H}(k)|^2\} = |\tilde{C}(k)|^2. \quad (14b)$$

$|\tilde{C}(k)|^2$ is the quantity that actually interacts with the electric field and is the actual measure of the backscatter spectrum.

In an inhomogeneous medium (such as a tissue specimen), a mixture of various particles within a few source coherence lengths can be described as $$h(n) = b_1(n) \otimes c_1(n) + b_2(n) \otimes c_2(n) + b_3(n) \otimes c_3(n) \qquad (15)$$

where $b_i(n)$ {i is a natural number} is a Bernoulli sequence describing positions of ith type of scatterers having the specific impulse response $c_i(n)$. Let $b_i(n)$ be white processes. Suppose these processes are statistically independent of each other. Fourier domain representation of Eq. 15 is $$\tilde{H}(k) = B_1(k)C_1(k) + B_2(k)C_2(k) + B_3(k)C_3(k) + \qquad (16)$$

where $B_i(k)$ and $C_i(k)$ are Fourier transforms of $b_i(n)$ and $c_i(n)$, respectively. Taking magnitude squares on both sides yields, $$|H(k)|^2 = \sum_{i=1}^{M} |B_i(k)|^2 |C_i(k)|^2 + \qquad (17)$$
$$B_1(k)C_1(k)B_2^*(k)C_2^*(k) + B_1(k)C_1(k)B_3^*(k)C_3^*(k) + \ldots$$

where M is the total number of types of scatterers. Taking expectation values on both sides, $$E\{|H(k)|^2\} = \sum_{i=1}^{M} E\{|B_i(k)|^2 |C_i(k)|^2\} + \qquad (18)$$
$$E\{B_1(k)C_1(k)B_2^*(k)C_2^*(k)\} + E\{B_1(k)C_1(k)B_3^*(k)C_3^*(k)\} + \ldots$$

Since we are dealing with white processes, the terms $E\{|B_i(k)|^2\} = K_i$ where $K_i$ are constants. Now $K_i$'s are proportional to the probabilities $p_i$'s of the occurrence of one in each Bernoulli process as long as $p_i$'s are much smaller than 0.5. Bernoulli processes can be considered white only within the bandwidth of the light source. Since the average of a Bernoulli sequence is non-zero and equals to $p_i$, there is a spike at zero frequency in the power spectrum and theoretically this process is not white. However, since our measurements are limited to the bandwidth of the source, we model these processes as white. When $p_i$'s are small, an increase in $p_i$ implies an increase in number of scatterers and hence stronger echoes are obtained. Since there are more zeros than ones, all the higher frequencies have equal strength and the strength increases with an increase in $p_i$. In the power spectrum, the spike at dc does not increase significantly. Therefore $K_i$ increases. When $p_i$'s are close to 0.5 or higher, there are many ones occurring and they may occur next to each other. That would imply the presence of a scatterer at every sample, which is rare and unlikely, and in such a case, we should be sampling more often. Also, even if the reflections are stronger, most of the power is in the dc level spike and an increase in $p_i$'s simply implies stronger spikes at dc.

The lower row on the right hand side of Eq. 18 can be written as $$\sum_{i,l=1}^{M} E\{B_i(k)C_i(k)B_l^*(k)C_l^*(k)\} \qquad (19)$$

Since $b_i(n)$ are statistically independent of each other, so do $B_i(k)$ and $B^*_l(k)$ and we get $$\sum_{i,l=1}^{M} E\{B_i(k)\} E\{B_l^*(k)\} C_i(k) C_l^*(k) \qquad (20)$$

Now $B_i(k)$ is a Fourier transform of $b_i(n)$:

$$B_i(k) = \sum_{n=-\infty}^{\infty} b_i(n) \exp\{-j2\pi kn\}. \qquad (21)$$

This implies that $$E\{B_i(k)\} = \qquad (22)$$
$$\sum_{n=-\infty}^{\infty} E\{b_i(n)\} \exp\{-j2\pi kn\} = p_i \sum_{n=-\infty}^{\infty} \exp\{-j2\pi kn\} = p_i \delta(k).$$

Therefore the cross terms become $$\sum_{i,l=1}^{M} p_i p_l C_i(0) C_l^*(0) \qquad (23)$$

considering the fact that $\delta(k)$ is just a spike of height one at $k=0$ in the case of a discrete Fourier transform. Clearly, these terms are not measurable for we can measure the spectra only within the bandwidth of the source and hence we can rewrite Eq. 18 as $$E\{|H(k)|^2\} = \sum_{i=1}^{M} K_i |C_i(k)|^2 \qquad (24)$$

which is same as the weighted average of the spectra of different scatterers situated within a few coherence lengths. Since the coherence length of the source is short, the depth over which the spectral information is obtained can be controlled by limiting the reference arm scan to a region of interest within the sample, or alternatively by digitally windowing the region of interest from one or more full length reference arm scans. Thus the transfer function $H(k)$ obtained over a wide range of path differences contains all available information concerning interaction of the tissue specimen with the sample arm light, including modifications in both amplitude and phase.

Again as indicated in Eq.(c), $\tilde{H}(k)$ is the quantity that actually interacts with the electric field. Using $\tilde{H}(k) = H(k+k_0)$ and $\tilde{C}_i(k) = C_i(k+k_0)$, $$E\{|\tilde{H}(k)|^2\} = \sum_{i=1}^{M} K_i |\tilde{C}_i(k)|^2 \qquad (24a)$$

In summary, for a monochromatic wave incident on a reflector, $\tilde{H}(k)$ is the reflection coefficient (i.e., backscattering coefficient) at a wavenumber k. $\tilde{H}(k)$ is real for many particles. $|\tilde{H}(k)|^2$ is the intensity reflectivity (i.e., backscattering cross-section) at a wavenumber k. If a monochromatic beam of light is incident on a group of identical particles located at the same depth, the effective $\tilde{H}(k)$ would just get scaled by the number of scatterers due to coherent addition of the scattered waves. However, if they are situated at different depths, then the reflections from all the scatterers would add coherently and h(z) would be complex because of phase delays occurred due to different optical depths of the particles. Therefore the effective H(k) would also be complex. Thus $|\tilde{H}(k)|^2$ would be related to the effective backscattering cross-section of scatterers at a wavenumber k. If a low-coherence light source is used, the reflections from scatterers located within the coherence length would add coherently. In that case $|\tilde{H}(k)|^2$ would be related to the effective backscatter spectrum of scatterers.

The impulse response h(z) essentially is a convolution of two functions, viz., a function b(z) which describes locations of scatterers and a function c(z) which is the inverse Fourier transform of C(k). C(k) denotes spectrally dependent electric field backscattering coefficient of the scatterers. The wavenumber dependent backscattering cross-section of the particles is represented by $|C(k)|^2$. We label c(z) as the specific impulse response of scatterers. While dealing with discrete data, h(z) is represented by h(n). For a homogeneous medium, we can write $h(n)=b(n) \otimes c(n)$ where b(n) and c(n) are discrete representations of b(z) and c(z), respectively. We could represent b(n) by a white Bernoulli sequence which is a series of randomly occurring zeros and ones and adjacent elements of the sequence are not related to each other. As shown in Eq. 14, above, because averaging estimates of $|B(k)|^2$ for a white sequence is assumed to be equal to a constant (1 for simplicity), averaging estimates of $|H(k)|^2$ (obtained from different locations in a homogeneous section of the specimen) provides an estimate of $|C(k)|^2$ which is the elastic backscatter spectrum of scatterers residing within that homogeneous region. The short source coherence length allows to control the depth over which the spectral information needs to be measured. This is achieved by selecting the reference arm scan to an area of interest in the sample, or alternatively by windowing the area of interest from one or more full length reference arm scans. While computing the spectra of scatterers located deep inside a specimen, one should note that C(k) has the information regarding the backscatter spectrum of scatterers as well as round-trip spectral filtering due to the intervening medium. Thus the interferometric signal contains depth resolved information about both the spatial distribution of scattering centers within a tissue sample, as well as about the spectral characteristics of the individual scatterers.

The system design gets simplified if we coherently demodulate the interferometric data. C(k) would be estimated using such a system. However, $|\tilde{C}(k)|^2$ or $E\{|\tilde{H}(k)|^2\}$ are preferably calculated as shown in Eq. 14b and Eq. 24a since they represent true interacting spectral characteristics of the tissue. If we process interferometric data directly, then $|\tilde{C}(k)|^2$ or $E\{|\tilde{H}(k)|^2\}$ will be obtained by performing the above analysis.

The above model also allows one to measure actual spectrum of the light in the sample arm. The spectrum of light in the sample arm is defined as $$\widehat{\tilde{S}}_{ss}(k) = \tilde{E}_s(k)\tilde{E}^*_s(k)$$

Using $\tilde{E}_s(k) = \tilde{E}_i(k)\tilde{H}^*(k)$ we get $$\widehat{\tilde{S}}_{ss}(k) = \tilde{S}_{ii}(k)|\tilde{H}(k)|^2$$
$$= |\tilde{S}_{is}(k)|^2 / \tilde{S}_{ii}(k)$$

Thus the spectrum of light in the sample arm is the source power spectrum multiplied by a function which has information regarding scatterers' locations and scatterers' backscattering spectra. Since we are interested in backscattering spectra, one needs to average $\widehat{\tilde{S}}_{ss}(k)$, i.e., compute $E\{\tilde{E}_s(k)\tilde{E}^*_s(k)\}$. We denote $E\{\tilde{E}_s(k)\tilde{E}^*_s(k)\}$ by $\tilde{S}_{ss}(k)$, i.e., $\tilde{S}_{ss}(k)=E\{\widehat{\tilde{S}}_{ss}(k)\}$ Thus $S_{ss}(k)$ is given by:

$$\tilde{S}_{ss}(k) = \tilde{S}_{ii}(k) E\{|\tilde{H}(k)|^2\}$$
$$= \{|\tilde{S}_{is}(k)|^2\} / \tilde{S}_{ii}(k)$$

for a homogeneous medium, $$\widehat{\tilde{S}}_{ss}(k) = \tilde{S}_{ii}(k) E\{|\tilde{H}(k)|^2\}$$
$$= \tilde{S}_{ii}(k)|\tilde{C}(k)|^2$$

and for a heterogeneous medium, $$\tilde{S}_{ss}(k) = \tilde{S}_{ii}(k) \Sigma_{i=1}^M K_i |\tilde{C}_i(k)|^2.$$

III. Depth Resolved Spectroscopy

Following from the above model, the present invention provides a system and method for determining depth resolved backscatter characteristics of scatterers within a sample by averaging (in the Fourier domain) the interferogram data obtained over a region of the sample. In particular, the backscatter characteristics are obtained according to the steps as illustrated in FIGS. 3a, 3b, 4a and 4b.

Figure 3A:
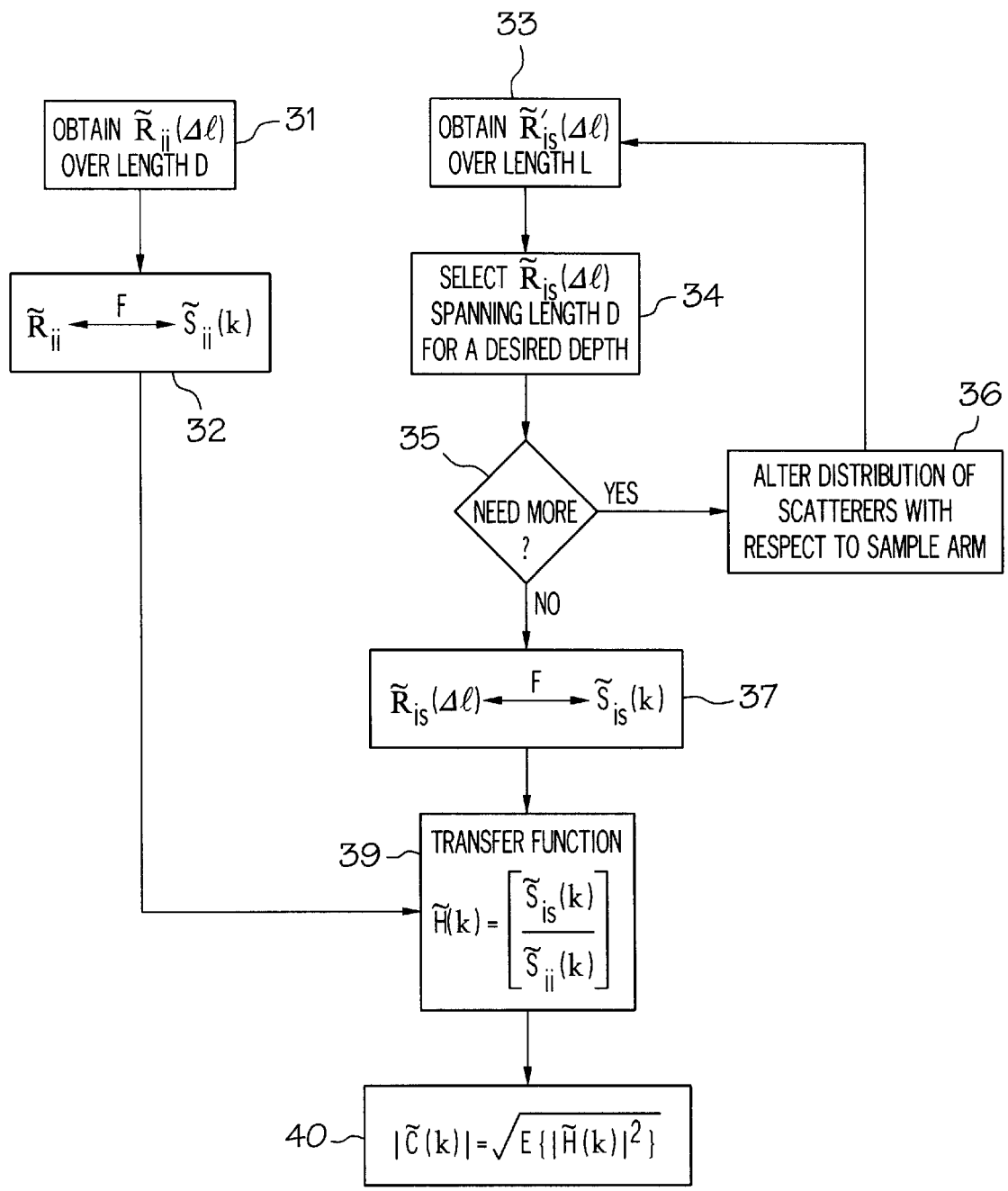
FIG. 3a is a flow-diagram representing a method of the present invention.

As shown in FIG. 3a, a first embodiment of a method for determining depth resolved backscatter characteristics of scatterers within a sample is illustrated. As indicated in step 31, the auto-correlation function $\tilde{R}_{ii}(\Delta l)$ over a predetermined depth D is acquired from an OCT system having an optical reflector in the sample arm; and as indicated in step 32, the auto-power spectrum $\tilde{S}_{ii}(k)$ is obtained from the auto-correlation data by performing a Fourier transform on the auto-correlation data.

As will be appreciated by those of ordinary skill in the art, there are several ways to obtain the auto-power spectrum for an OCT system, all of which are within the scope of the present invention. For example, the auto-correlation data can be measured using a strong reflector which is a part of the specimen itself; the auto-correlation function can be modeled using the information about the radiation source; and the auto-correlation function can be also calculated using the knowledge of the source power spectral density. For instance, the inverse Fourier transform of the measured source power spectrum would provide an estimate of the auto-correlation function. Additionally, since the auto-power spectrum is nothing but the source power spectrum, the auto-power spectrum can be obtained using the knowledge of the source. For instance, the source power spectrum measured using any spectrometer or a spectrum analyzer would provide an estimate of the auto-power spectrum.

As indicated in steps 33, 34, 35 and 36, multiple sets of cross-correlation data are obtained, where the distribution of scatterers within the sample has been altered for each acquisition or where the sample arm is repositioned slightly for each acquisition. As indicated in step 33 the cross-correlation function $\tilde{R}'_{is}(\Delta l)$ over a full length L is acquired from the OCT system having the biological tissue sample in the sample arm; next, as indicated in step 34, the cross-correlation function is segmented into short segments of length D each to obtain depth resolved spectra with axial resolution D. Length D is typically longer than or equal to the source coherence length. These segments of cross-correlation data $\hat{R}'_{is}(\Delta l)$ are called $\hat{R}_{is}(\Delta l)$. As indicated in step 35, it is determined whether a sufficient number of cross-correlation functions have been acquired; and as indicated in step 36, if more data is needed, the distribution of scatterers within the sample is altered or the sample arm is slightly repositioned prior to returning to step 33.

The number of sets of cross-correlation data to obtain depends upon the desired estimation accuracy of $E\{|\tilde{H}(k)|^2\}$, and typically ranges from 50 to 500 scans. In step 36, the distribution of scatterers can be altered, for example, by lightly squeezing or stretching the tissue sample, by propagating sound or ultrasonic waves through the tissue while acquiring the data, or by repositioning the sample arm with respect to the sample. For the purposes of the present invention such steps will be referred to as altering the distribution of scatterers with respect to the sample arm.

If, in step 36, the sample arm is repositioned, the extent of such repositioning depends upon the beam diameter at the depth of interest, and is typically 20–50 mm. The separation between two adjacent scans should be at least the source beam diameter in the tissue. Since the beam waist is different at different depths within the tissue, the minimum required separation will be different for each depth.

As indicated in step 37, the cross-power spectrum $\tilde{S}_{is}(k)$ is obtained from each cross-correlation function by performing a Fourier transform on the cross-correlation function $\hat{R}_{is}(\Delta l)$. As indicated in step 39, a transfer function H(k) is determined for each cross-power spectrum $\tilde{S}_{is}(k)$ by taking the ratio of each cross-power spectrum $\tilde{S}_{is}(k)$ versus the auto-power spectrum $\tilde{S}_{ii}(k)$. And as indicated in step 40, the magnitude of the backscatter spectrum C(k) is calculated by averaging the magnitudes of the squared transfer functions and then taking the square root of the average.

Figure 3B:
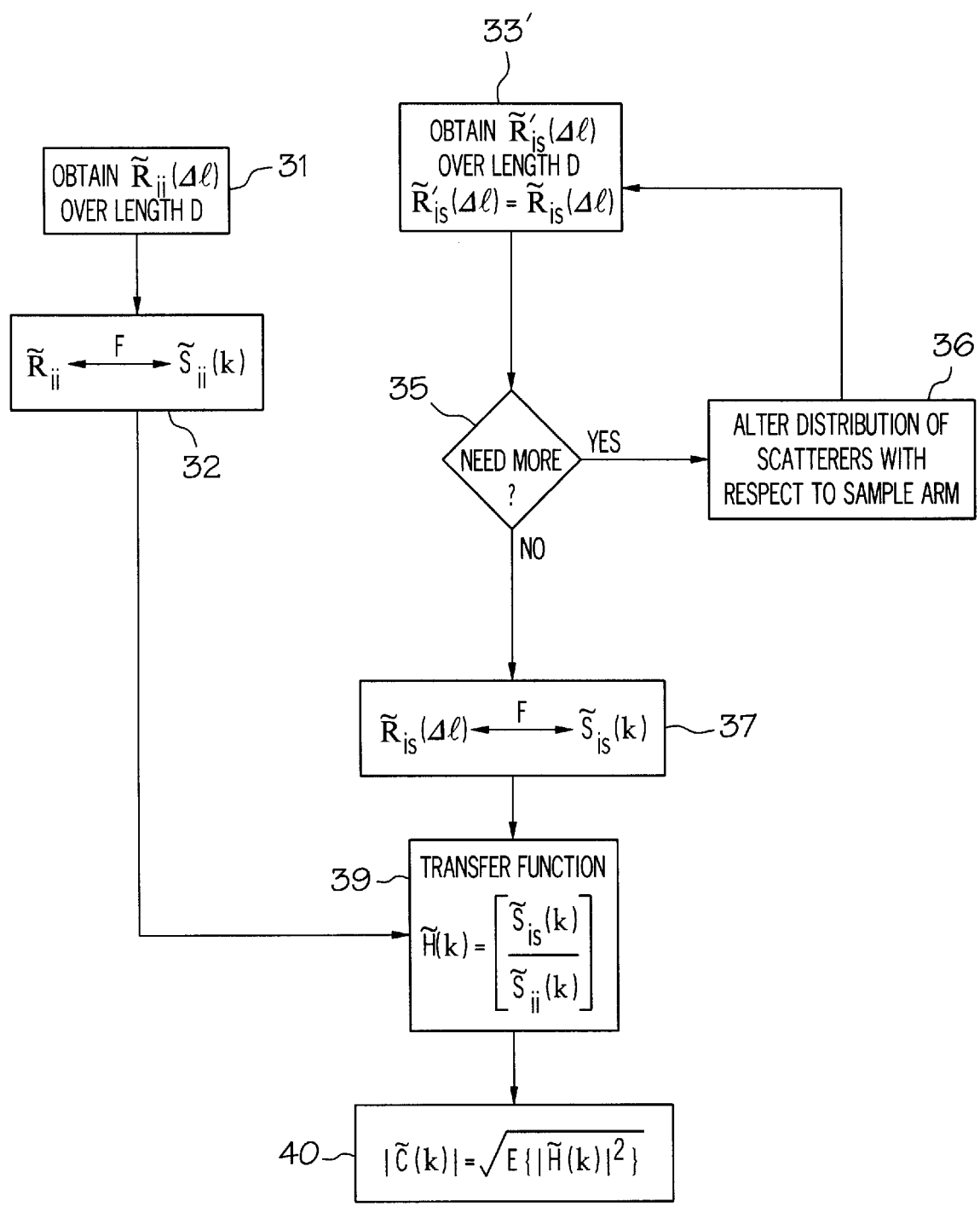
FIG. 3b is a flow-diagram representing a method of the present invention.

FIG. 3b illustrates a slightly modified version of the method illustrated in FIG. 3a. In particular, steps 33 and 34 of FIG. 3a are replaced with step 33' in FIG. 3b. As indicated in step 33' the cross-correlation function $\hat{R}'_{is}(\Delta l)$ over a full length L is acquired; however, the full length L is equal to the desired segment length D, and therefore, a step of segmenting the cross-correlation data is not required.

Figure 4A:
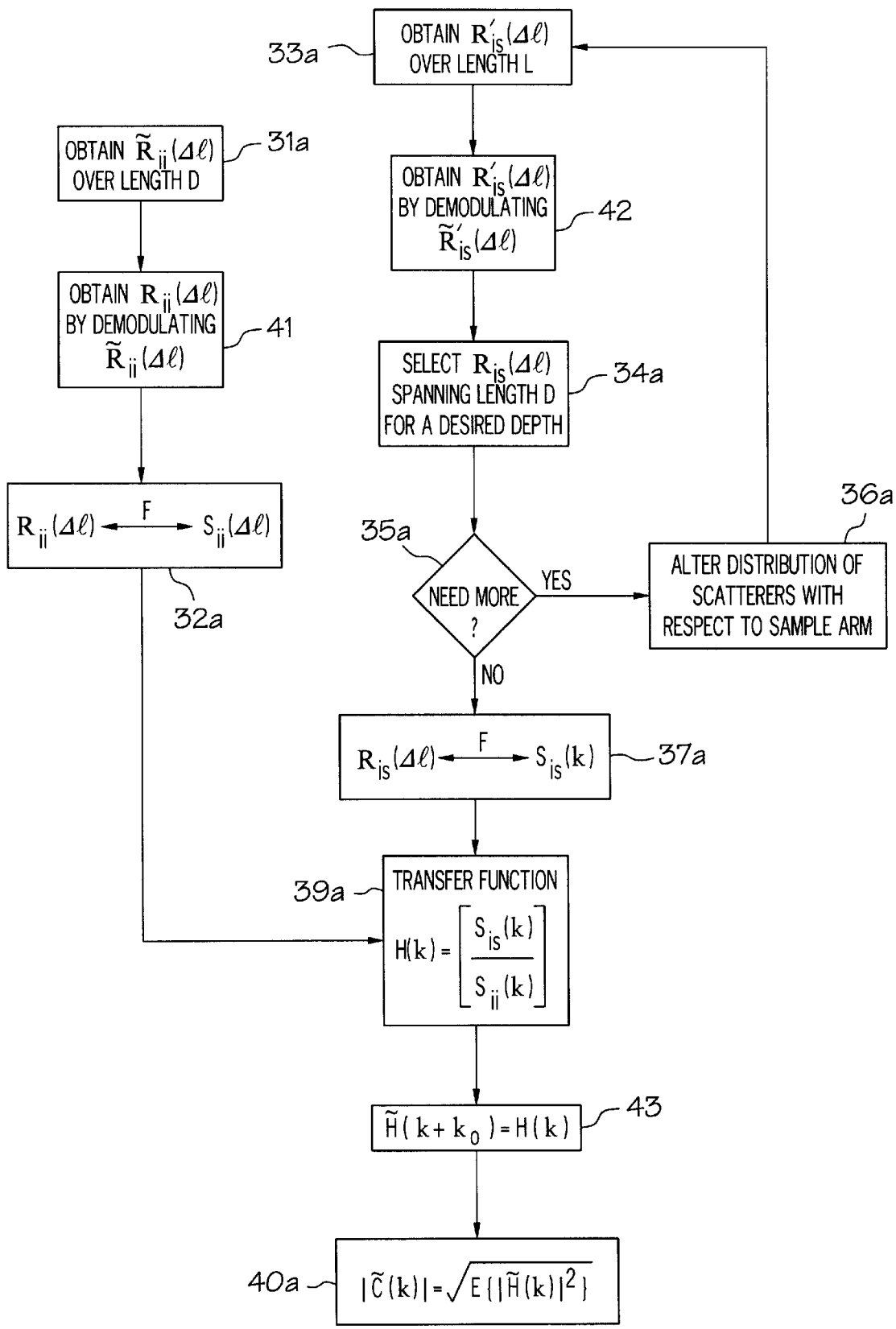
FIGS. 4a–b is a flow-diagram representing a method of the present invention.

FIG. 4a illustrates another embodiment of a method for determining depth resolved backscatter characteristics of scatterers within a sample. The primary difference between the method illustrated in FIG. 3a and the method illustrated in FIG. 4a that the method illustrated in FIG. 4a includes the steps of coherently demodulating the auto- and cross-correlation functions at the center wavenumber of the source prior to obtaining the auto- and cross-power spectrums, respectively. Additionally, each transfer function calculated is adjusted to shift the axis from the center wavenumber of the source, thereby ridding the effect of the demodulation steps.

As indicated in step 31a, the auto-correlation function over a predetermined depth D is acquired from an OCT system having an optical reflector in the sample arm; as indicated in step 41 the auto-correlation function is demodulated at the center wavenumber of the source; and as indicated in step 32a, the auto-power spectrum is obtained from the demodulated auto-correlation data by performing a Fourier transform on the demodulated auto-correlation data. As indicated in steps 33a, 42, 34a, 35a and 36a, multiple sets of cross-correlation data are obtained, where the distribution of scatterers within the sample has been altered for each acquisition or where the sample arm is repositioned slightly for each acquisition. As indicated in step 33a the cross-correlation function over a full length L is acquired from the OCT system having the biological tissue sample in the sample arm; next, as indicated in step 42, the cross-correlation function is demodulated at the center wavenumber of the source; next, as indicated in step 34a, the demodulated cross-correlation function is segmented into short segments of length D each to obtain depth resolved spectra with axial resolution D. As indicated in step 35a, it is determined whether a sufficient number of cross-correlation functions have been acquired; and as indicated in step 36, if more data is needed, the distribution of scatterers within the sample is altered or the sample arm is slightly repositioned prior to returning to step 33.

As indicated in step 37a, the cross-power spectrum is obtained from each of the demodulated cross-correlation functions by performing a Fourier transform on the cross-correlation function. As indicated in step 39a, a transfer function is determined for each cross-power spectrum by taking the ratio of each cross-power spectrum versus the auto-power spectrum. As indicated in step 43, each transfer function calculated is adjusted to shift the axis from the center wavenumber of the source, thereby removing the effect of the demodulation steps (see Equation 14(a)). And as indicated in step 40a, the magnitude of the backscatter spectrum C(k) is calculated by averaging the magnitudes of the squared transfer functions and then taking the square root of the average.

Figure 4B:
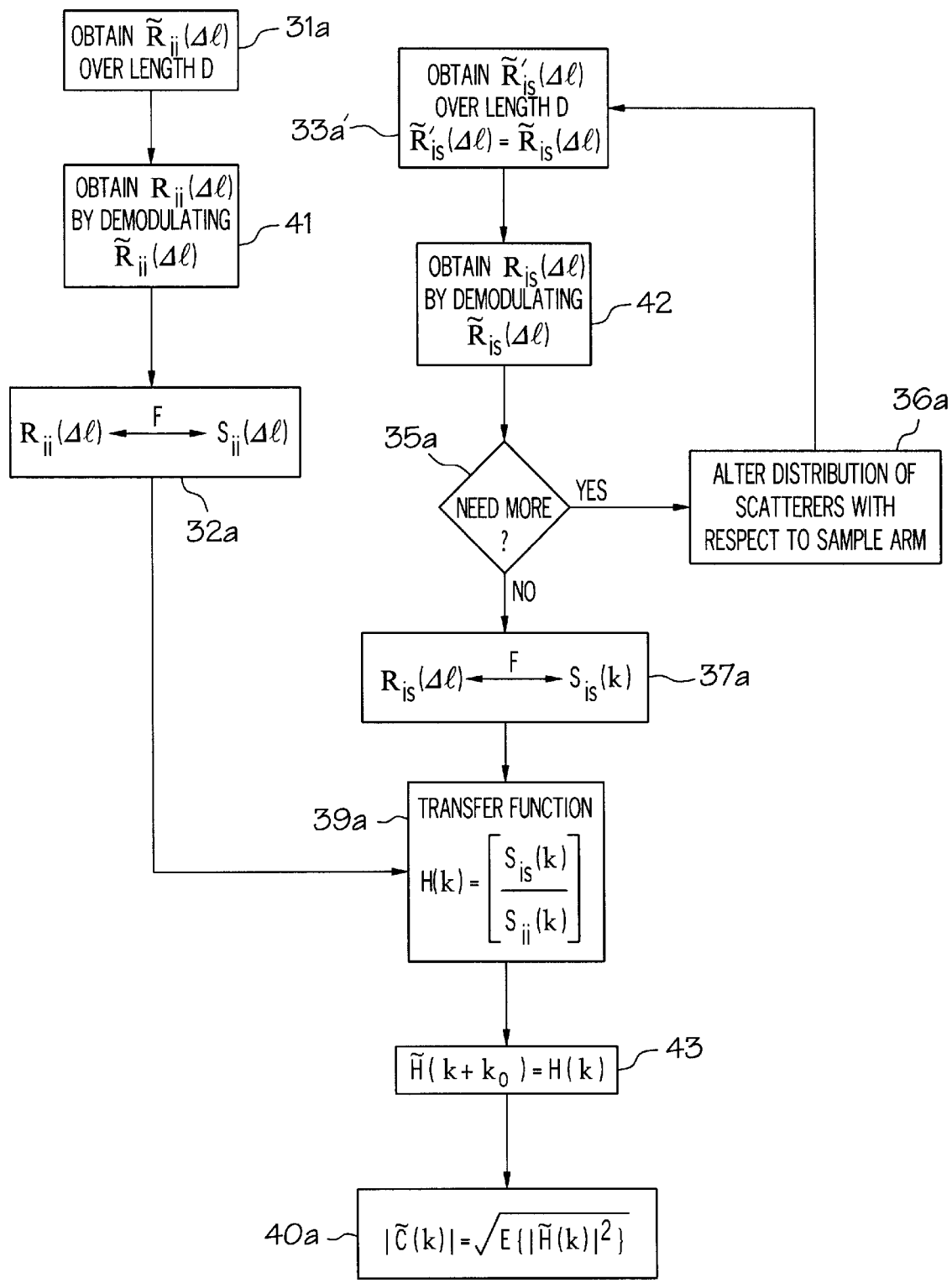

FIG. 4b illustrates a slightly modified version of the method illustrated in FIG. 4a. In particular, steps 33a and 34a of FIG. 4a are replaced with step 33a' in FIG. 4b. As indicated in step 33' the cross-correlation function over a full length L is acquired; however, the full length L is equal to the desired segment length D, and therefore, a step of segmenting the cross-correlation data is not required.

Figure 5:
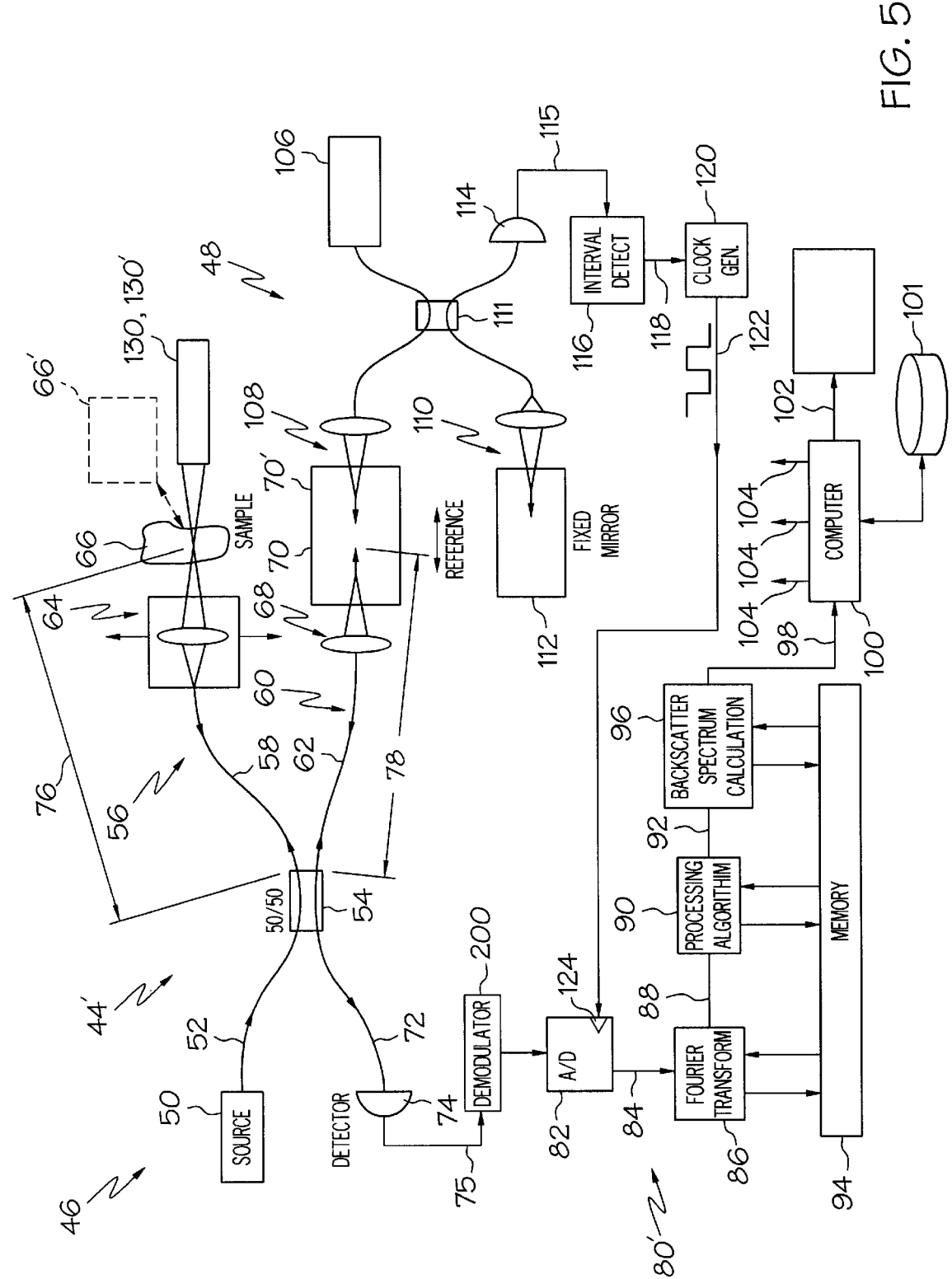
FIG. 5 is a schematic, block-diagram representation of an OCT data acquisition and digital signal processing system of the present invention.

As shown in FIG. 5, an OCT data acquisition system 44 for performing the above method includes a low-coherence interferometer 46 and, preferably, a calibration interferometer 48. The low-coherence interferometer includes a radiation source 50, such as a super-luminescent diode ("SLD") source, a fiber-optic source line 52 coupled between the SLD 50 and a fiber-optic beam splitter (such as a 50/50 fiber coupler) 54. The beam splitter separates the light received from the source line 52 into two beams; one transmitted to a sample arm 56 via an optical fiber 58, and the other to a reference arm 60 via an optical fiber 62. The fiber 58 is coupled to a sample probe 64 adapted to focus light to a sample 66 and to receive the light reflected back from the sample 66. The reflected light received back from the sample is transmitted back to the beam splitter 54 via the fiber 58. Preferably, the sample probe 64 has an adjustable focal length, thus allowing the adjustment of the focal spot size, working distance, and depth of focus.

The fiber 62 is coupled to a reference probe 68 adapted to focus the light received from the fiber 62 to a translating reference mirror 70 (usually mounted on a galvanometer), and to receive the light reflected back from the reference mirror 70. The reflected light received back from the reference mirror is transmitted back to the beam splitter 54 via the fiber 62. The reflected light received by the beam splitter 54, back from both the fiber 58 and fiber 62, is combined and transmitted on the fiber-optic line 72 to the photodetector 74. The photodetector 74 produces an analog signal 75 responsive to the intensity of the incident electric field. An example of a photodetector for use with the present invention is a Model 1811, commercially available from New Focus, Inc., Mountain View, Calif.

It will be apparent to one of ordinary skill in the art that there are many known methods and/or mechanisms for injecting the above reference arm delay, other than a translating reference mirror. All of these methods, of course, are within the scope of the present invention.

Alternative reference arm optical delay strategies include those which modulate the length of the reference arm optical fiber by using a piezo-electric fiber stretcher, methods based on varying the path length of the reference arm light by passing the light through rapidly rotating cubes or other rotating optical elements, and methods based on Fourier-domain pulse-shaping technology which modulate the group delay of the reference arm light by using an angularly scanning mirror to impose a frequency-dependent phase on the reference arm light after having been spectral dispersed. This latter technique, which is the first to have been shown capable of modulating the reference arm light fast enough to acquire OCT images at video rate, depends upon the fact that the inverse Fourier transform of a phase ramp in the frequency domain is equal to a group delay in the time domain. This latter delay line is also highly dispersive, in that it can impose different phase and group delays upon the reference arm light. For such a dispersive delay line, the OCT interferogram fringe spacing depends upon the reference arm phase delay, while the position of the interferogram envelope at any time depends upon the reference arm group delay. All types of delay lines can be described as imposing a Doppler shift frequency $$f_r = V_\phi \frac{k_0}{2\pi}$$

on the reference arm light, where Doppler shift frequency in this context is defined as the time derivative of the phase of the central frequency component present in the interferometric signal $\tilde{R}_{is}(\Delta l)$. $V_\phi$ is the scan rate of optical phase delay in the reference arm. $V_\phi$ is also considered as scan rate of the optical phase delay difference between the reference and sample arms. This definition of Doppler shift frequency encompasses all possible reference arm delay technologies. The optical path length 76 of the sample arm 56 is different for reflecting and scattering sites at different depths (altering the scatterer distribution will change the reflector locations), while the optical path length 78 of the reference arm 60 changes with the translation of the reference mirror 70. Recording the detector current while translating the reference mirror 70 provides interferogram data, which is the optical path length dependent cross-correlation function $\tilde{R}_{is}(\Delta l)$ of the light retroreflected from the reference mirror 70 and the sample 66. Collecting interferogram data for a point on the surface of the sample for one reference mirror cycle is referred to as collecting an "A-scan." The A-scan data provides a one-dimension profile of scattering information of the sample 66 verses depth.

The analog interferogram data signal 75 produced by the photodetector 74, for each A-scan, is sent through data processing scheme 80, designed to perform the steps as described above in FIGS. 3a–4b. The data processing scheme 80 includes an analog-to-digital converter 82 for converting the analog interferogram data 75 produced by the photodetector 74 into a digital interferogram signal 84. The digital interferogram signal 84 is sent to a windowed Fourier transform algorithm 86 for obtaining the cross-power spectrum $\tilde{S}_{is}(k)$ data 88. Windowed Fourier transform algorithm 86 uses a Fourier transform algorithm which is available in software libraries in commercially available software packages such as LabVIEW supplied by National Instruments, Austin, Tex.

The cross-power spectrum data is then sent to a processing algorithm 90 for calculating the transfer function estimate H'(k) data 92. The processing algorithm 90 is coupled to a memory 94 for storing the auto-power spectrum data and for storing the multiple transfer functions H'(k) used for calculating the backscatter spectrum C(k). To obtain the auto-power spectrum data, the sample 66 is replaced by a mirror 66' and the data received by the photodetector 74 is the optical path length dependent auto-correlation function $\tilde{R}_{ii}(\Delta l)$ of the source light generated from the light retroreflected from the reference mirror 70 and the sample mirror 66'. The analog-to-digital converter 82 converts the analog auto-correlation function 75 into a digital signal and the Fourier transform algorithm 86 then obtains the auto-power spectrum $\tilde{S}_{ii}(k)$ data 88. When the processing algorithm 90 receives the auto-power spectrum $\tilde{S}_{ii}(k)$ data, it stores the data in the memory 94. Accordingly, the processing algorithm 90 will have access to the auto-power spectrum $\tilde{S}_{ii}(k)$ for calculating each estimate of the transfer function H(k) as described above.

Each estimate of the transfer function H(k) 92 is preferably obtained by the processing algorithm 90 according to the ratio of each cross-power spectrum $\tilde{S}_{is}(k)$ versus the stored auto-power spectrum $\tilde{S}_{ii}(k)$.

Once all of the transfer function estimates H'(k) 92 have been calculated, the transfer function estimates H'(k) are transmitted to an algorithm 96 for obtaining the average of the squared magnitudes of the transfer function estimates, and for calculating the backscatter spectrum estimate $|\tilde{C}'(k)|^2$ 98 by taking the square root of the average as discussed above with respect to step 40 of FIGS. 3a and 3b, and step 40a of FIGS. 4a and 4b. An algorithm 96 for use with the present invention may be implemented in commercially available software packages such as LabVIEW supplied by National Instruments, Austin, Tex.

Note that the operations described herein have been performed and tested in software using packages such as LabVIEW and MATLAB. It is also within the scope of the invention that these operations be performed by using hardware DSP devices and circuitry. For example, the Fourier transform algorithm 86, the processing algorithm 90 and the algorithm 96 may be performed by hardware devices or circuits specially designed to perform the steps as described above. Such hardware devices or circuits are conventional and thus will be apparent to those of ordinary skill in the art.

The backscatter spectrum C(k) 98 is transmitted to a computer 100 for comparison against backscatter data from a 'normal' tissue that is stored in the database 101. Additional applications for the backscatter spectrum C(k) 98 are given below. The computer 100 also preferably generates the control signals 104 for controlling the above process. For example, the computer may simultaneously control the lateral translation of the sample probe 64 and the translation of the reference mirror 70; and the computer 100 may also provide controls for coordinating the deconvolution scheme 80. Furthermore, it should be apparent to one of ordinary skill in the art, that the computer 100 could contain all or portions of the data processing scheme 80, or that the data processing scheme could be part of a separate analog or digital circuit, etc.

It will be apparent to those of ordinary skill in the art that a demodulation step/device may be incorporated to the system of FIG. 5 to demodulate the interferogram data 75 or 84 prior to the processing steps/components discussed above. For example, see FIG. 4b.

Figure 6:
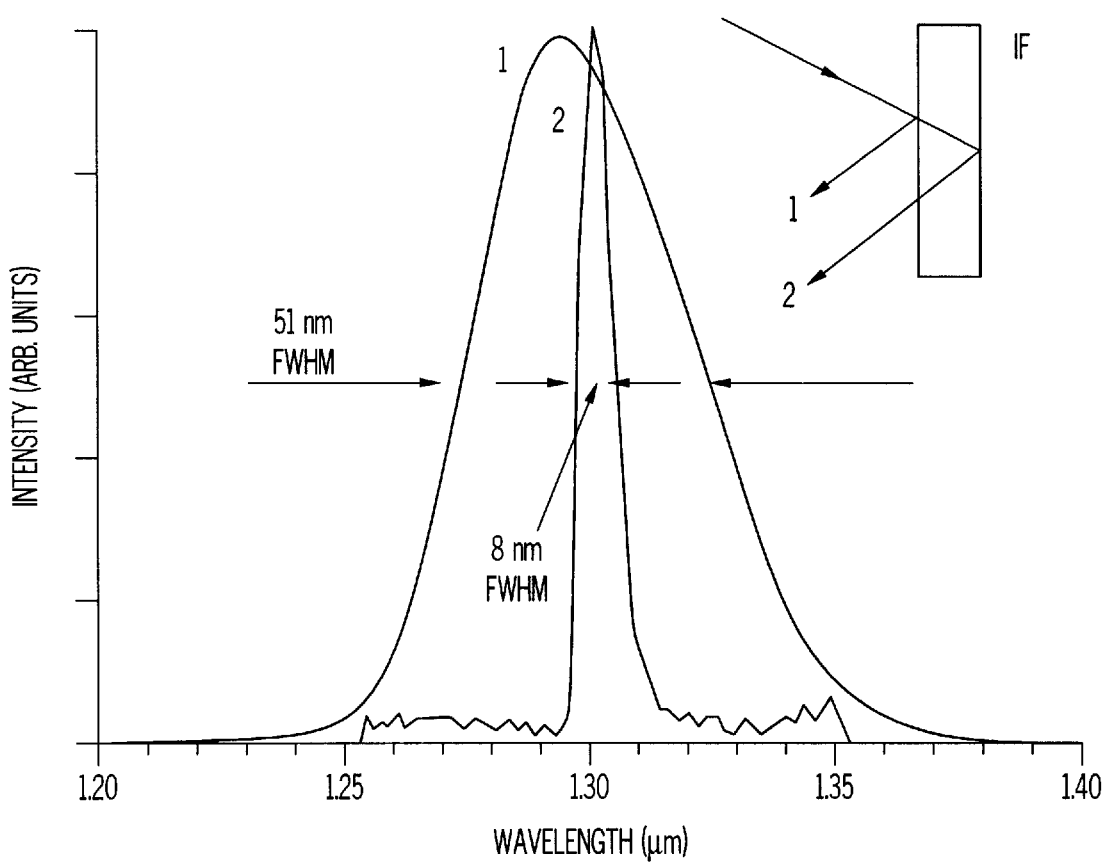
FIG. 6 illustrates experimental results of a method of the present invention.

A preliminary demonstration of depth resolved spectroscopy using OCT is provided in FIG. 6. In the figure, the spectrum of the light incident on an interference filter is plotted along with the transfer function (i.e., spectral passband characteristic) corresponding to a double pass through the filter. The transfer function is obtained using Eq. 6 of the model developed above from an OCT A-scan of the filter, windowed to the vicinity of the glass-air interface from the rear side of the filter. Referring to FIG. 6, the spectrum of light (1) incident on a commercial interference filter (IF) and the transfer function characteristic (passband) resulting from a double pass through an interference filter (2) are plotted. Both spectra were obtained by separately gating and processing localized interferometric data resulting from Fresnel reflections at the front and rear surfaces of the filter, respectively. The measured spectral widths correspond well with the manufacturer's specifications (SLD: spectral width 47 nm FWHM; filter: bandwidth 10 nm FWHM single-pass).

IV. Depth Resolved Backscatter Fourier Transform Spectroscopy Application

In many diseases structural changes occur at the cellular and sub-cellular level in the affected organ. Examples of such changes include enlargement and changes in shapes of nuclei in colonic adenoma (which is a precursor to colonic cancer) and an increased population of inflammatory cells in ulcerative colitis. These scatterers in the tissue have dimensions comparable to the near infra-red wavelengths of the light source (e.g., 1250 nm to 1350 nm for the SLD in our laboratory). Therefore the scattering process is best described by the phenomenon of "Mie scattering" for which the backscattering cross-sections of these scattering sites are highly frequency dependent. In a typical histopathological assessment, changes in cellular structure are examined. These include changes in cellular as well as nuclear sizes and shapes and clustering patterns of the cells or nuclei. Variations in morphology affect the elastic scattering properties of cells. This variation in backscattering properties of the tissue microstructure could be exploited to diagnose various diseases. Depth resolved elastic backscattering spectroscopic information could aid in detecting the shapes and sizes of the lesions in an affected organ and thus assist in accurate staging of diseases such as the cancer.

Extracellular architecture as well as the sizes and shapes of cells and cellular components exhibit variations in different tissue types as well as in different layers within the same tissue. The frequency dependence of the elastic backscattering properties of biological materials is closely related to these morphological changes. Therefore this spectral information can be used in detecting shapes, sizes or refractive indices of various particles at different depths in the tissue specimen. This can be achieved since the backscattered spectrum is a function of shape, size and the refractive index of the particles and the refractive index of the surrounding medium.

This spectral information may also provide contrast mechanisms based on differential backscattering spectroscopic properties of the sites localized within different depth regions of the specimen. Range gated spectra thus obtained can be used to develop various contrast enhancement mechanisms. For instance, an OCT image obtained with complex envelope information can be displayed as a gray scale image using amplitude information. It is possible to compute spectra resolved at different depths in regular intervals using complex envelope data. This spectral information can be "color" coded (e.g., one can encode the peaks or widths of the spectra in various colors). Thus the gray scale image can be supplemented with this "color" information resulting in a colored OCT image. Better differentiation between the layers in OCT images could be achieved by using such a color information.

This spectral information could also be used to complement the diagnostic capability of OCT. Three dimensionally resolved spectroscopy could assist in studying the extent of infiltration of a disease such as cancer. database of spectral signatures of various layers of normal and abnormal tissue samples. The pathological states at different layers could be determined by comparing the spectra acquired at these layers with those in the database. Two dimensional lateral scanning of the tissue samples may provide the degree of invasion of diseases accurately.

V. Methods to Obtain Spectra at a Given Depth

As described in section III, the cross-correlation function $\hat{R}'_{is}(\Delta l)$ corresponding to a lateral (or angular in endoscopy/catheterization applications) position of the sample probe over a full length L is acquired from the OCT system having the biological tissue sample in the sample arm and is segmented into short segments of length D each to obtain depth resolved spectra with axial resolution D. D is typically chosen to be longer than or equal to the source coherence length. These segments of cross-correlation data $\hat{R}'_{is}(\Delta l)$ are called $\hat{R}_{is}(\Delta l)$.

Here we elaborate on a method to obtain segments of $\hat{R}'_{is}(\Delta l)$. First a starting depth and a window of depth range D is selected. At the selected starting depth, the values of digitized $\hat{R}'_{is}(\Delta l)$ (i.e., $\hat{R}'_{is}(n)$) are selected corresponding to depth range D. The selected array corresponding to the depth range D is called digitized $\hat{R}_{is}(\Delta l)$ (i.e., $\hat{R}_{is}(n)$) and is passed into a Fourier transform circuit or algorithm to obtain a power spectrum $\tilde{S}_{is}(k)$ for that particular depth range.

Next, at a predetermined point past the starting depth, another depth window of $\hat{R}_{is}(n)$ is extracted from $\hat{R}'_{is}(n)$. From this next depth window, $\tilde{S}_{is}(k)$ is calculated as described above. New windows will thereafter be repeatedly extracted and processed to generate a complete spectral profile for the particular $\hat{R}'_{is}(\Delta l)$.

This operation can be summarized by the following equation (known as windowed Fourier transform (WFT) equation):

$$\tilde{S}_{is}(n\Delta z, qk^P) = \left[\sum_{m=-N/2}^{N/2-1} \hat{R}'_{is}[(n+m)\Delta z]\exp[-jqk^P m\Delta z]w(m\Delta z)\right]$$

where $w(mDz)$ is the analysis window through which the sampled space-domain cross-correlation function $\hat{R}'_{is}(n)$ is shifted, Dz is the sampling interval, and N is the number of samples contributing to the local spectral estimate centered at depth nDz.

Thus N samples of $\tilde{S}_{is}(n\Delta z, k)$ are acquired. $\tilde{S}_{is}(n\Delta z, qk^P)$ is $\tilde{S}_{is}(k)$ measured at depth nDz. Here $k^P = 1/(N\Delta z)$ is the sampling interval in wavenumber domain, and q is an integer. The numbers $$\tilde{S}_{is}\left(n\Delta z, -\left(\frac{N}{2}\right)k^P\right), \tilde{S}_{is}\left(n\Delta z, -\left(\frac{N-2}{2}\right)k^P\right),$$

$$\ldots \tilde{S}_{is}(n\Delta z, qk^P) \ldots, \tilde{S}_{is}\left(n\Delta z, \left(\frac{N-1}{2}\right)k^P\right)$$

denote N measurements of a the cross-power spectrum sampled at spatial frequencies $$Nk^P/2, -\binom{N-2}{2}k^P\ldots, qk^P, \ldots$$

Thus the spatial resolution of the spectral estimate is given by the window size (NDz), the larger the window—the lower the spatial resolution. But spectral estimation precision $k^P$ is inversely related to the window size and is given by $$k^P = 1/(N\Delta z)$$

This equation is derived using discrete Fourier transform properties. Thus the larger the window—the better the spectral resolution.

If $\tilde{R}'_{is}(\Delta l)$ is coherently demodulated to obtain the complex envelope $\hat{R}'_{is}(\Delta l)$, then a similar procedure provides depth resolved spectra. As described in section III, the cross-correlation function $\tilde{R}'_{is}(\Delta l)$ corresponding to a lateral (or angular in endoscopy/catheterization applications) position of the sample probe over a full length L is acquired from the OCT system having the biological tissue sample in the sample arm and is segmented into short segments of length D each to obtain depth resolved spectra with axial resolution D. D should be longer than or equal to the source coherence length. These segments of cross-correlation data $\hat{R}'_{is}(\Delta l)$ are called $\hat{R}'_{is}(\Delta l)$.

Here we elaborate on a method to obtain segments of $\hat{R}'_{is}(\Delta l)$. First a starting depth and a window of depth range D is selected. At the selected starting depth, the values of digitized $\hat{R}'_{is}(\Delta l)$ (or $\hat{R}'_{is}(n)$) are selected corresponding to depth range D. The selected array corresponding to the depth range D is called digitized $\tilde{R}_{is}(\Delta l)$ (or $\tilde{R}_{is}(n)$) and is passed into a Fourier transform circuit or algorithm to obtain a power spectrum $S_{is}(k)$ for that particular depth range.

Next, at a predetermined point past the starting depth, another depth window of $R_{is}(n)$ is extracted from $\tilde{R}'_{is}(n)$. From this next depth window, $S_{is}(k)$ is calculated as described above. New windows will thereafter be repeatedly extracted and processed to generate a complete spectral profile for the particular $\tilde{R}'_{is}(\Delta l)$.

This operation can be summarized by the following equation:

$$S_{is}(n\Delta z, qk_p) = \left[\sum_{m=-N/2}^{N/2-1} R'_{is}[(n+m)\Delta z]\exp[-jqk_p m\Delta z]w(m\Delta z)\right]$$

$S_{is}(n\Delta z, qk^P)$ is $S_{is}(k)$ measured at depth nDz.

Thus the spatial resolution of the spectral estimate is given by the window size (NDz), the larger the window—the lower the spatial resolution. But spectral estimation precision $k^P$ is inversely related to the window size and is given by $$k^P = 1/(N\Delta z)$$

This equation is derived using discrete Fourier transform properties. Thus the larger the window—the better the spectral resolution.

Several types of analysis windows may be used in the circuit/algorithm, including rectangular, Bartlett (triangular), Hamming, Hanning, Blackman windows. It is well known to those skilled in the art that the choice of window may affect the power spectrum estimation accuracy. In our experiments we used a simple rectangular window. An alternative implementation of the window is to pad the N-point analysis window with zeros on either side, increasing its length in order to enhance the frequency precision. The size (length) of the window is indicated as NDz which must be shorter than the entire A-scan length L. While a user may choose the window length as short as he wishes, it may be apparent to those of ordinary skill in the art that due to the interference from the reflectors located within a coherence length, the axial resolution is limited by the coherence length. Therefore it is desirable to choose the window length longer than or equal to the coherence length.

The above steps for converting the interferogram data into power spectrum data may be performed by a bank of narrow-band band-pass filters (NBPF), where each NBPF passes a particular wavenumber along the power spectrum wavenumber scale. The outputs of each NBPF may be input directly into the transfer function calculation. This method eliminates the need for the windowed Fourier transform circuit/algorithm and, may also eliminate the need for the coherent demodulation circuit/algorithm. Thus, this method provides faster and cheaper signal processing.

These NBPF may also be implemented by a bank of demodulators and a corresponding bank of low-pass filters, where each demodulator demodulates the data at a particular wavenumber along the power spectrum frequency scale and each corresponding low-pass filter filters the output of the demodulator to only pass a narrow band of wavenumbers as desired by users.

These NBPF can be applied directly to $\hat{R}'_{is}(\Delta l)$ or $\tilde{R}'_{is}(\Delta l)$ to obtain $\tilde{S}'_{is}(k)$ or $S_{is}(k)$, respectively. Also, one may demodulate $\tilde{R}'_{is}(\Delta l)$ at a wavenumber other than $k_0$ to produce a signal which can be fed to NBPF to eventually generate $\tilde{S}_{is}(k)$ or $S_{is}(k)$.

Thus in this alternate embodiment of the present invention, the necessity of a windowed Fourier transform step to produce the power spectra may $\tilde{S}_{is}(k)$ or $S_{is}(k)$ may be eliminated by utilizing a bank of narrow-band band-pass filters ("NPBFs"), where each NBPF passes a particular frequency along the power spectrum frequency scale.

Figure 7:
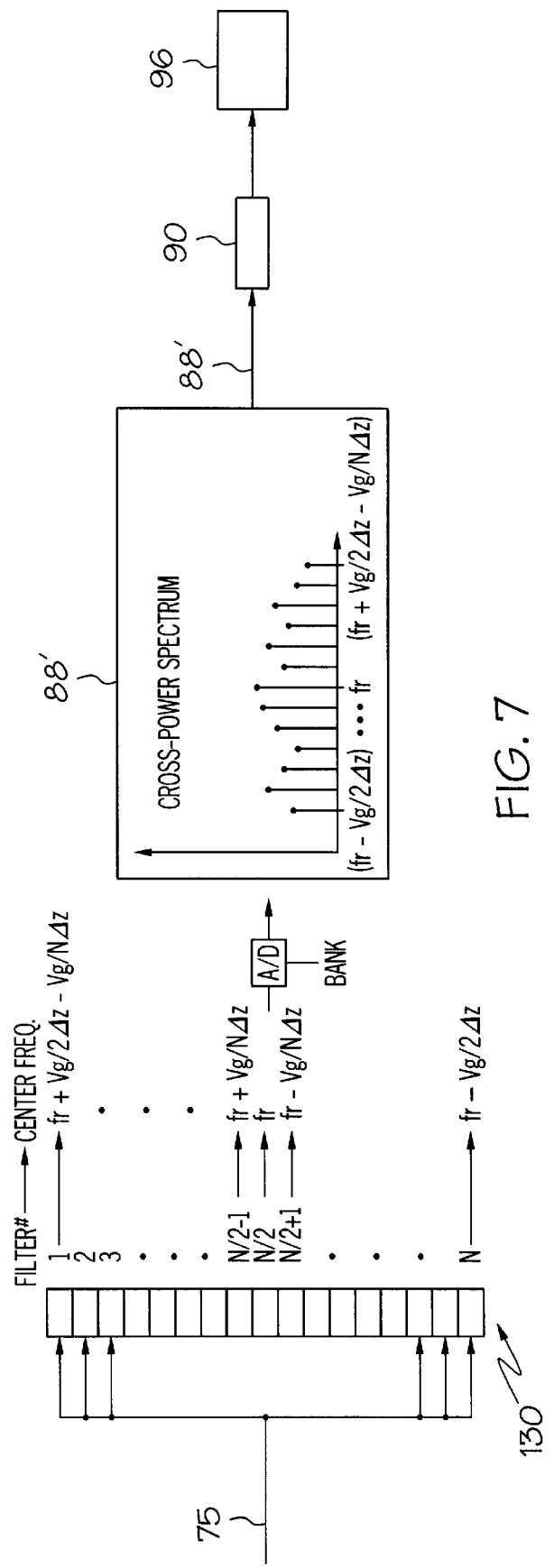
FIG. 7 is a schematic flow-diagram representing an alternate embodiment for obtaining a cross-power spectrum according to the present invention.

As shown in FIG. 7, a bank of NBPFs 130 may be positioned to filter the raw, (non-demodulated) photodetector signal 75 and produce the cross-power spectrum 88'. From the cross-power spectrum 88' the processing algorithm 90 is used to generate a transfer function and the algorithm/circuit 96 is used to calculate the backscatter spectrum estimate. The bank 130 comprises N NBPFs, each having a bandwidth of approximately ($V_g$/NDz). Here $V_g$ is the scan rate of the group delay of the reference arm as compared to the sample arm. $V_g = 2V_r$ for a simple mechanically translated reference mirror. Such a filter provides spatial frequency precision given by $k^P = 1/(N\Delta z)$. The center frequency of each NBPF corresponds to a particular wavenumber along the wavenumber scale of a power spectrum $\tilde{S}_{is}(k)$, centered at the source center wavenumber $k_0$. If $f_c$ is the center frequency of a band-pass filter (BPF), then, the corresponding wavenumber is given by:

$$k = k_o\left(1 - \frac{V_\phi}{V_g}\right) + \frac{f_c}{V_g}2\pi$$

For a simple mechanically translated reference mirror, $V_g = V_f = 2V_r$ $$k = \frac{f_c}{V_r}\pi$$

Thus, some of the NBPFs will pass frequencies below the Doppler shift frequency of the reference arm $f_r$, and the rest will pass frequencies above the reference arm Doppler shift frequency $f_r$. For example, the middle NBPF will be centered at the reference arm Doppler shift frequency,$f_r$; the next NBPF above the center NBPF will be centered at the frequency $f_r+V_g/NDZ$; and the next NBPF below the center NBPF will be centered at the frequency $f_r-V_g/NDZ$. In this alternate embodiment, the coherent demodulation circuit/device and the windowed Fourier transform circuit/step are not needed.

Figure 8:
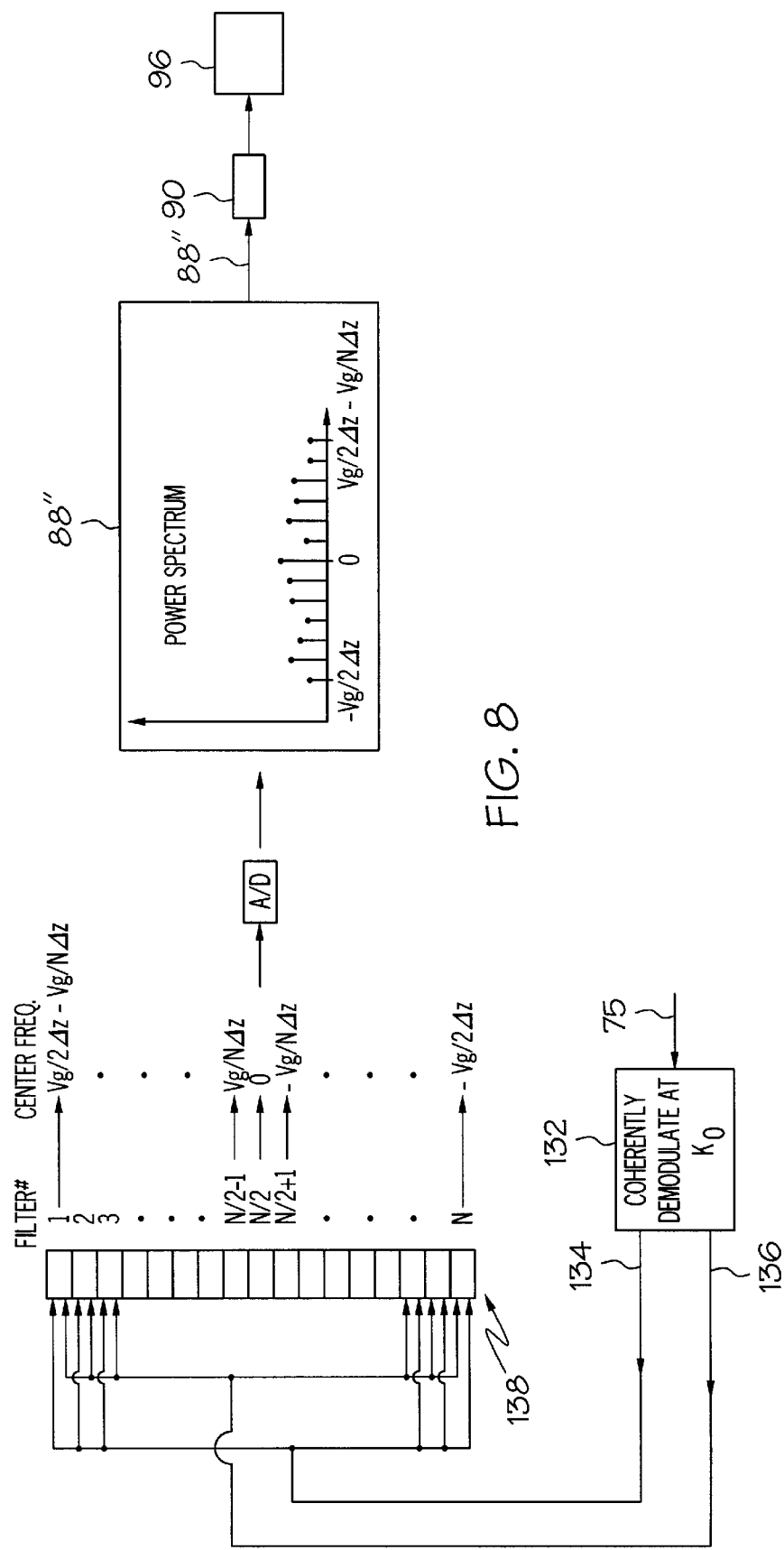
FIG. 8 is a schematic flow-diagram representing another alternate embodiment for obtaining a cross-power spectrum according to the present invention.

Alternatively, as shown in FIG. 8, the photodetector signal 75 is demodulated at the center wave number of the source, by demodulation step/device 132, to produce analog in-phase "I" 134 and analog quadrature "Q" data 136. A bank of complex NBPFs 138 are positioned after the coherent demodulation step/device 132, where each receives both the analog in-phase "I" 134 and the analog quadrature "Q" 136 components of $R_{is}(\Delta l)$. The bank 138 comprises NBPFs, each having a bandwidth of approximately $V_g/NDz$, where the center frequency of each NBPF corresponds to a particular wavenumber along the wavenumber scale of the power spectrum $S_{is}(k)$ 88" centered at zero wavenumber. Thus, some of the NBPFs will pass frequencies below zero, and the rest will pass frequencies above zero. The middle NBPF will be centered at zero frequency; the next NBPF above the center NBPF will be centered at the frequency $V_g/NDz$; and the next NBPF below the center NBPF will be centered at the frequency—$V_g/NDz$. In this alternate embodiment, the windowed Fourier transform circuit/step is not needed. From the cross-power spectrum 88" the processing algorithm 90 is used to generate a transfer function and the algorithm/circuit 96 is used to calculate the backscatter spectrum estimate. As discussed above in FIGS. 4a and 4b, because a deconvolution step was performed on the interferogram data, the axis of the transfer function must be shifted to remove the effect of demodulation.

If $f_c$ is the center frequency of a band-pass filter (BPF), then, the corresponding wavenumber is given by:

$$k = k_o + \frac{f_c}{V_g}2\pi$$

It will be apparent to one of ordinary skill in the art that the array of complex NBPFs may be replaced by two arrays of NBPFs, one array for the in-phase data, and one array for the quadrature data; and the square-root of the sum of the squares of the output of each array will yield the resultant power spectrum $S_{is}(k)$.

Figure 9:
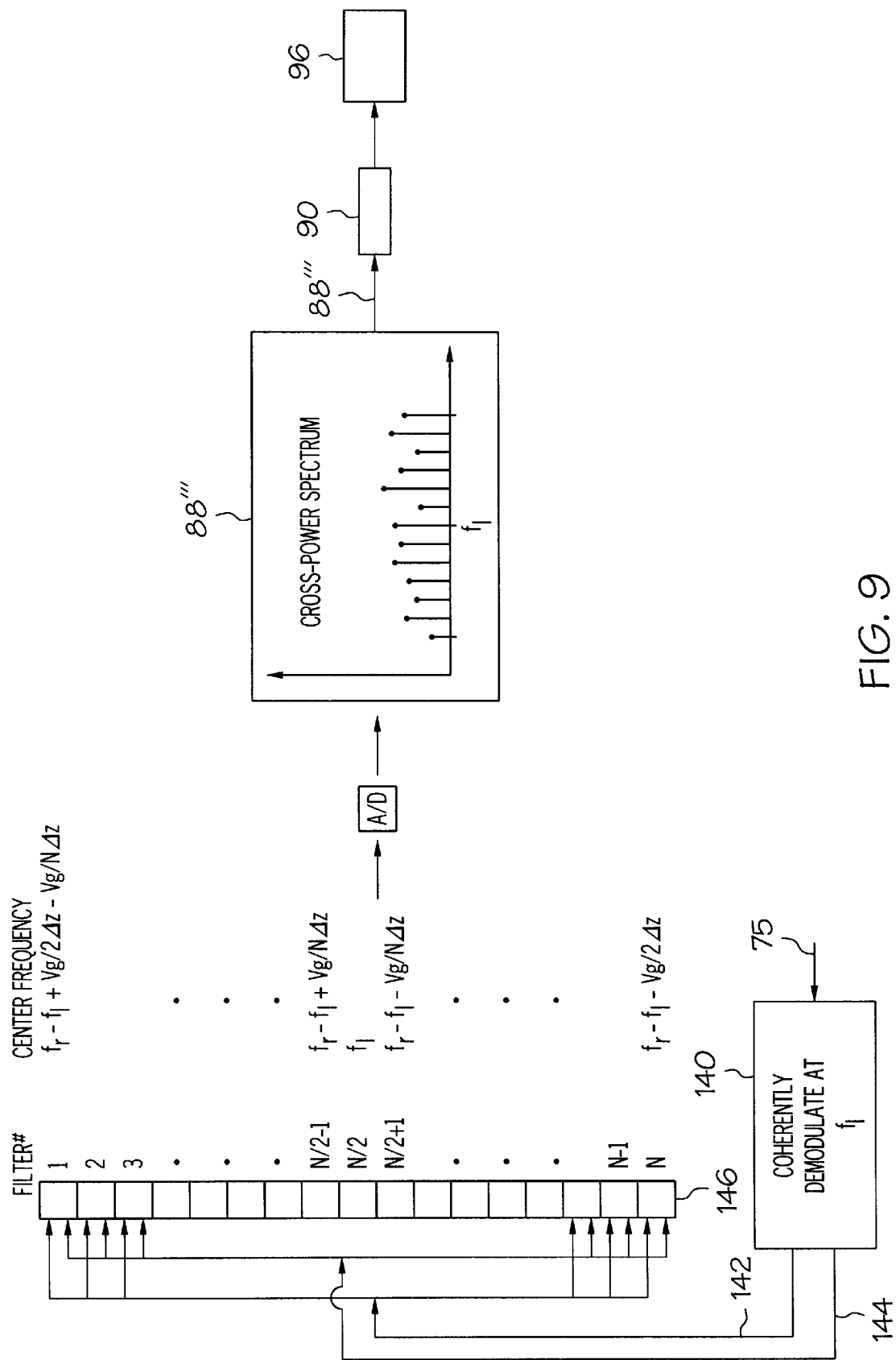
FIG. 9 is a schematic flow-diagram representing yet another alternate embodiment for obtaining a cross-power spectrum according to the present invention.

Finally, as shown in FIG. 9, the interferometer signal 75 can be coherently demodulated at frequency $f_I$, as shown in block 140, to produce in-phase data 142 and quadrature data 144. The in-phase and quadrature data is fed into a bank of complex NBPFs 146 to generate a cross-power spectrum 88'''. The bank comprises N NBPFs, each having a bandwidth of approximately $V_g/NDz$, where the center frequency of each NBPF corresponds to a particular wavenumber along the wavenumber scale of a power spectrum centered at frequency $f_I$. Thus, some of the NBPFs will pass frequencies below $f_I$, and the rest will pass frequencies above $f_I$. The middle NBPF will be centered at $f_I$, the next NBPF above the center NBPF will be centered at the frequency $f_r-f_I+V_g/NDz$; and the next NBPF below the center NBPF will be centered at the frequency $f_r-f_I-V_g/NDz$. The wavenumber k is given by:

$$k = k_o\left(1 - \frac{V_\phi}{V_g}\right) + \frac{f_c + f_I}{V_g}2\pi$$

In this alternate embodiment, the windowed Fourier transform circuit/step is not needed. From the cross-power spectrum 88" the processing algorithm 90 is used to generate a transfer function and the algorithm/circuit 96 is used to calculate the backscatter spectrum estimate. As discussed above in FIGS. 4a and 4b, because a deconvolution step was performed on the interferogram data, the axis of the transfer function must be shifted to remove the effect of demodulation.

It will be apparent to one of ordinary skill in the art that the array of complex NBPFs may be replaced by two arrays of NBPFs, one array for the in-phase data, and one array for the quadrature data; The frequency $f_I$ is selected such that the NBPFs are centered in the few kHz frequencies. Such NBPFs are cheaper, and more readily available than NBPFs centered in the frequencies near the reference arm Doppler shift frequency $f_r$.

The banks of NBPF, discussed above, may also be replaced by a bank of demodulators and low-pass filters, where the demodulation frequency is same as the center frequency of the corresponding BPF and each corresponding low-pass filter has a bandwidth as desired by users.

It should be obvious to one skilled in the art that the approach of using a bank of NBPF's or demodulators to obtain spatially-localized frequency information is quite general, and is not necessarily limited to the case of using all NBPF's symmetrically distributed around the reference arm Doppler shift frequency, or around baseband or at evenly spaced frequencies, or even all with the same pass bandwidth. The user may have the option to select any frequency to monitor, with any bandwidth desired.

VI. Method to Measure Actual Spectrum of the Light in the Sample Arm

Figure 10A:
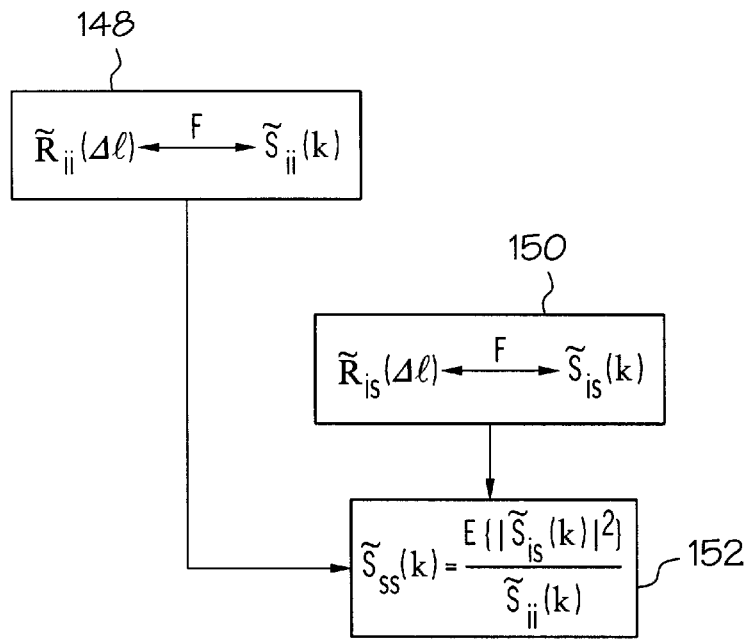
FIG. 10a is a flow-diagram representing a method for obtaining a spectrum of light in the sample arm according to the present invention.

Following from the model described above in Section II, the present invention also provides a system/method for determining or measuring the actual spectrum $\tilde{S}_{ss}(k)$ of the light in the sample arm 56. As shown in FIG. 10a, a first embodiment of this method includes a step 148 of obtaining an auto-power spectrum according to any of the procedures described herein; a step 150 of obtaining multiple cross-power spectrum readings from the interferometer signal according to any of the procedures described herein, where the distribution of the scatterers within the sample is altered with respect to the sample arm for each reading; and a step 152 of calculating the spectrum $\tilde{S}_{ss}(k)$ of the light in the sample arm according to the following equation:

$$\tilde{S}_{ss}(k) = E\{|\tilde{S}_{is}(k)|^2\}/\tilde{S}_{ii}(k)$$

Figure 10B:
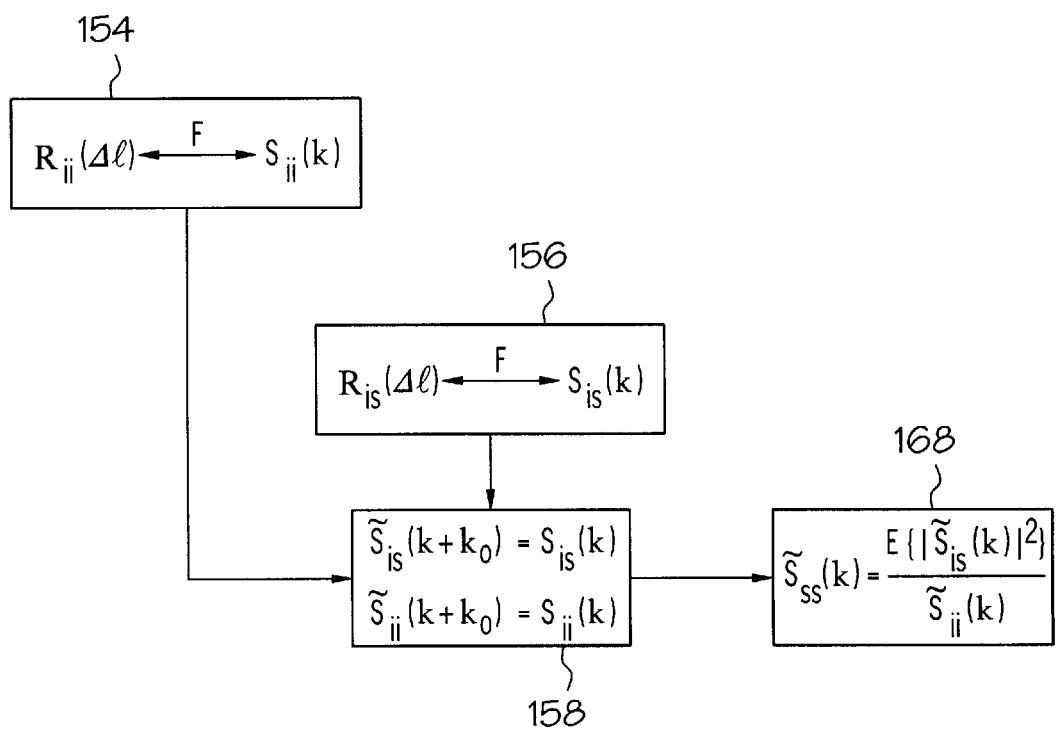
FIG. 10b is a flow-diagram representation of an alternate method for obtaining a spectrum of light in the sample arm according to the present invention.

As shown in FIG. 10b, an alternate embodiment of this method includes a step 154 of obtaining a demodulated auto-power spectrum according to any of the procedures described herein; a step 156 of obtaining multiple demodulated cross-power spectrum readings from the interferometer signal according to any of the procedures described herein, where the distribution of the scatterers within the sample is altered with respect to the sample arm for each reading; a step 158 of adjusting the axis of each of the demodulated auto- and cross-power spectra to remove the effect of the demodulation step; and a step 160 of calculating the spectrum $\tilde{S}_{ss}(k)$ of the light in the sample arm according to the following equation:

$$\tilde{S}_{ss}(k) = E\{|\tilde{S}_{is}(k)|^2\}/\tilde{S}_{ii}(k)$$

VII. Reference Arm Optical Path-length Calibration

It is advantageous, in the above data processing scheme, that the auto-correlation and cross-correlation functions be measured with the sub-micron accuracy. Therefore, to enhance the accuracy of the low coherence interferogram acquisition, a long coherence length calibration interferometer 48 is incorporated into the system to accurately monitor and compensate for the inevitable velocity fluctuations of the reference mirror 70.

As shown in FIG. 5, the calibration interferometer 48 includes a long-coherence length, narrow-band laser illumination source 106, such as a helium neon (He—Ne) laser or a distributed feed-back diode laser (DFB diode laser), a reference probe 108, and a sample probe 110. The narrow-band illumination source must have a coherence length that is longer than the region (depth) in the sample 66 that is being scanned (for example, the He—Ne laser has a coherence length of several meters).

The illumination source 106 transmits to a beam splitter 111, which separates the source signal into two illumination source signals, one being transmitted to the reference probe 108 and the other being transmitted to the sample probe 110. The reference probe 108 focuses its illumination source signal to the mirror 70' mounted on the back of the reference mirror 70 which is mounted on the galvanometer, and the sample probe 110 transmits its illumination source signal to a fixed mirror 112. The interferometer also includes a photodetector 114 for receiving the combination of light reflected back from the reference mirror 70 and the fixed mirror 112, and for producing an analog signal 115 corresponding to the intensity of light received. Because a long-coherence length illumination source 106 is used, the analog interferometric signal 115 produced by the photodetector 114 will be a relatively constant amplitude sinusoidal signal, having a frequency equal to the Doppler shift corresponding to velocity fluctuations in the reference mirror 70 experienced by the electric field in the reference arm.

The analog signal 115 produced by the photodetector 114 is sent to an interval-detect circuit 116, for detecting features in the signal 115 that are regular in time (such as zero crossings). These features 118 are fed into a clock generator circuit 120 for generating a digital clock source signal 122 for clocking (triggering) the analog-to-digital converter device 82 used in the deconvolution scheme 80. Accordingly, the sampling rate of the analog-to-digital converter 82 will be synchronized according to the fluctuations in the reference mirror 70 translation velocity detected by the calibration interferometer 48. Examples of interval-detect and clock generator circuits for use with the present invention include Tektronix 465 oscilloscope, commercially available from Tektronix, inc.

As will be apparent to those of ordinary skill in the art, there are many way to use the calibration interferometer 48 to compensate for the inevitable velocity fluctuations in the reference mirror speed; all of which are within the scope of the present invention. For example, an alternate method for incorporating the narrow-band illumination source calibration interferometer into the data acquisition system includes the steps of: digitizing both the calibration and the SLD interferograms at a sampling rate that is higher than twice the frequency of the calibration interferogram; detecting regular features, corresponding to regular intervals of space, of the calibration interferogram (e.g., zero crossings) using a thresholding or pattern recognition algorithm; and re-sample the SLD interferogram data at the regular intervals using interpolation routines.

VIII. Stimulated Coherent Spectroscopic Optical Coherence Tomogaphy (SC-SPOCT)

The present invention also provides a system and method for performing three-dimensionally resolved coherent spectroscopy by taking advantage of the depth-resolving capability of OCT. In principle, any coherent scattering process may be detected by OCT, as long as the scattered light remains within the bandwidth of the OCT source light spectrum. In particular, we disclose a method for depth-resolving stimulated coherent scattering processes using a system based upon the SPOCT concept. Stimulated coherent scattering processes involve a transfer of energy from photons in an intense pump beam and from excited states of an atom or molecule to a typically weaker probe beam. The probe photon frequency is typically Stokes shifted (i.e., is at a lower frequency) from the pump photon frequency. Examples of stimulated coherent scattering processes include stimulated emission, stimulated Raman scattering, coherent anti-Stokes Raman scattering (in which case the probe photon frequency is higher than the pump photon frequency) stimulated Brillouin scattering, stimulated Rayleigh scattering, stimulated Rayleigh-wing scattering, four-wave mixing, and others which are well known to those practiced in the art. In typical stimulated scattering experiments, the pump photons are provided by an intense laser pump source, and the probe photons are either provided by a weak probe beam or are provided by incoherent scattering processes or noise. The operation of a laser, for example, is based on stimulated emission of radiation at the laser oscillation frequency which builds up from optical noise present in the laser cavity due to a spontanous (i.e., incoherent) emission background. In stimulated Raman scattering experiments, the probe beam may either be supplied as a weak source at a frequency corresponding to the Raman transition to be interrogated in the sample, or it may also be allowed to build up from incoherent spontaneous Raman scattering noise. In either case, the intense pump radiation sets up a condition in which the probe experiences frequency-dependent coherent gain in the medium. The frequency dependence of the gain is determined by the medium's specific atomic and molecular composition; thus probing the frequency dependence of the stimulated gain may serve as a sensitive probe of tissue biochemistry with applications in medical diagnostics. In typical experiments of this type, the probe radiation is monochromatic and the gain experienced in traversing an excited medium is measured using either direct, gated, or synchronous detection techniques as the frequency of the probe radiation is scanned. The primary idea of stimulated coherent spectroscopic OCT is to take advantage of the broad spectral content of OCT probe light in combination with a separate pump light beam to perform stimulated coherent spectroscopy over the whole source spectrum at once, while simultaneously using the short coherence length of the OCT probe light to depth resolve the resulting stimulated scattering spectrum.

Referring again to FIG. 5, in stimulated coherent spectroscopic OCT an intense pump laser 130 is directed to the sample 66 at the appropriate frequency to induce depth- and frequency-dependent gain in the sample volume interrogated. The depth resolved sample scattering spectrum $\tilde{C}(k)^2$ or sample arm power spectrum $\tilde{S}_{ss}(k)$ obtained according to the steps discussed above will thus contain features corresponding to the frequency-dependent round-trip gain experienced by the OCT source radiation (inelastic backscattering characteristics of the scatterers resident within the window). Specific means for combining the pump and probe beams in SC-SPOCT are illustrated in FIGS. 11a and 11b.

For stimulated scattering processes which do not require phase matching between the pump and probe beams, the pump beam may be directed into the sample at any angle with respect to the probe beam. A convenient design is thus to combine the pump and probe beams coaxially, as illustrated in FIGS. 11a and 11b. In the bulk optic SC-SPOCT system illustrated in FIG. 11a, the pump light 130 is combined with the sample arm light 204 in beamsplitter #2 206 which may be either a broadband, wavelength-independent beamsplitter (similar to beamsplitter #1), or else preferably may be a dichroic beamsplitter which preferentially reflects the pump laser light and passes the OCT probe light. It should be obvious that beamsplitter #2 206 may be placed at any point in the sample arm of the interferometer either before or after the sample arm focusing optics. Also, beamsplitter #2 may also be placed before beamsplitter #1 54, although this is not a preferred embodiment since interference between the long-coherence-length pump light in the sample and reference arms will make detection of the probe light interference more difficult. Several other modifications to the normal OCT setup are required for SC-SPOCT. Since some of the intense pump light may be reflected from the sample and hence re-coupled into the interferometer, some optical elements designed to protect sensitive interferometer components and allow for optimal performance may be added. These may include an optical isolator 212 placed immediately after the OCT broadband source, and a wavelength-selective filter 216 placed before the detector 74. The wavelength-selective filter 216 may be a wavelength long-pass filter in the typical case in which the pump laser frequency is higher than the probe light frequency, or else it may be a wavelength short-pass filter in the opposite case or a interference band-pass (at the OCT probe wavelength) or band-reject (at the pump laser wavelength) filter in either case. It should also be noted that the sample arm optics depicted in FIGS. 11a and 11b are only a schematic representation of whatever sophisticated optics may be present in the actual interferometer, including, for example, the relay coupling and focusing optics of a biomicroscope, endoscope, catheter, or other medical diagnostic device. Finally, a timing trigger 220 may be provided for the purpose of gated or synchronous detection (described later). This trigger may be derived from an independent trigger source, or from the trigger electronics of either the pump laser or OCT probe source. The trigger may also be obtained from detection of a small pick-off beam from either the pump laser or OCT probe light source, in a manner which is familiar to those skilled in the art.

Figure 11A:
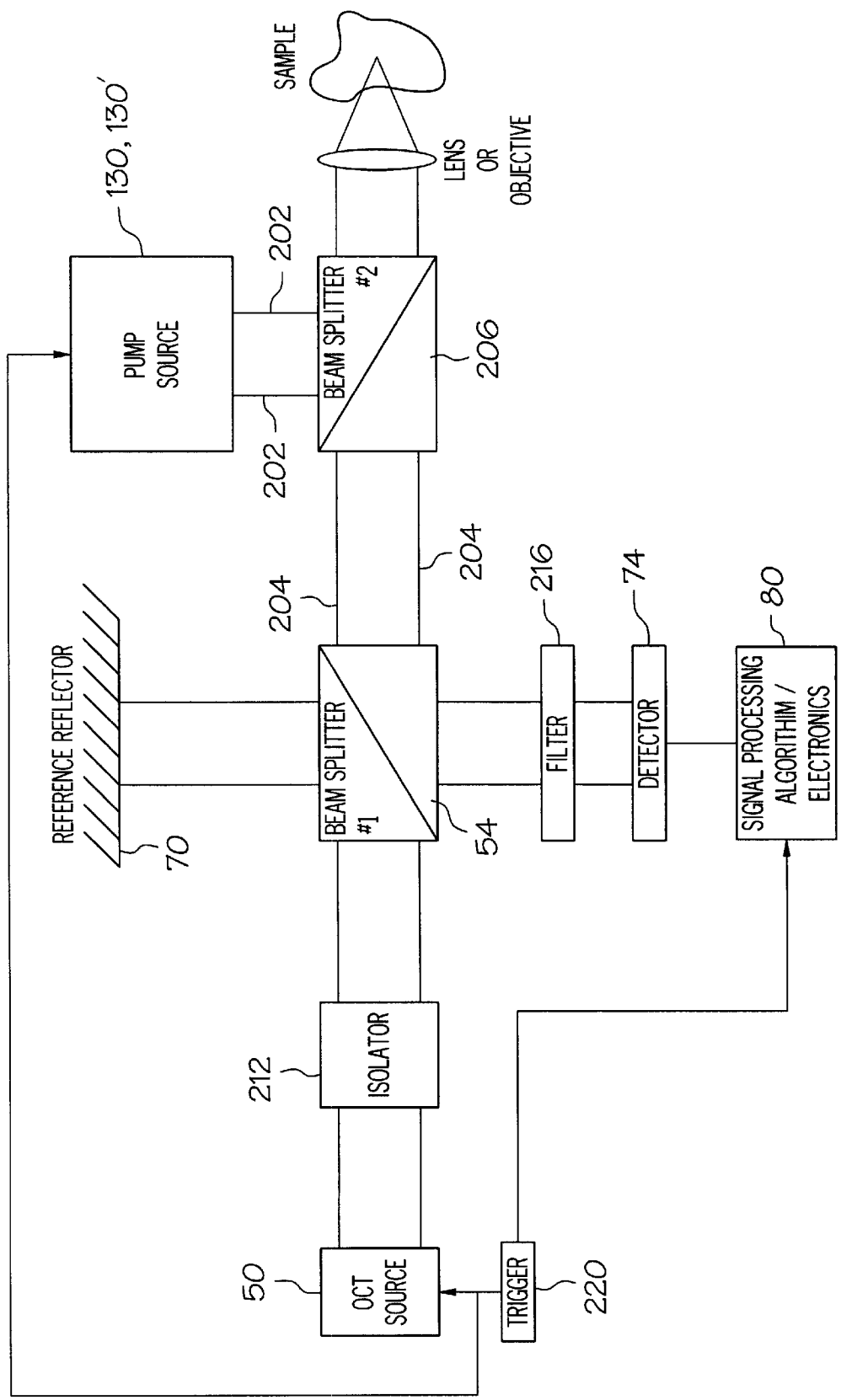
FIG. 11a is a schematic block diagram representation of an alternate data acquisition and signal processing system of the present invention.
Figure 11B:
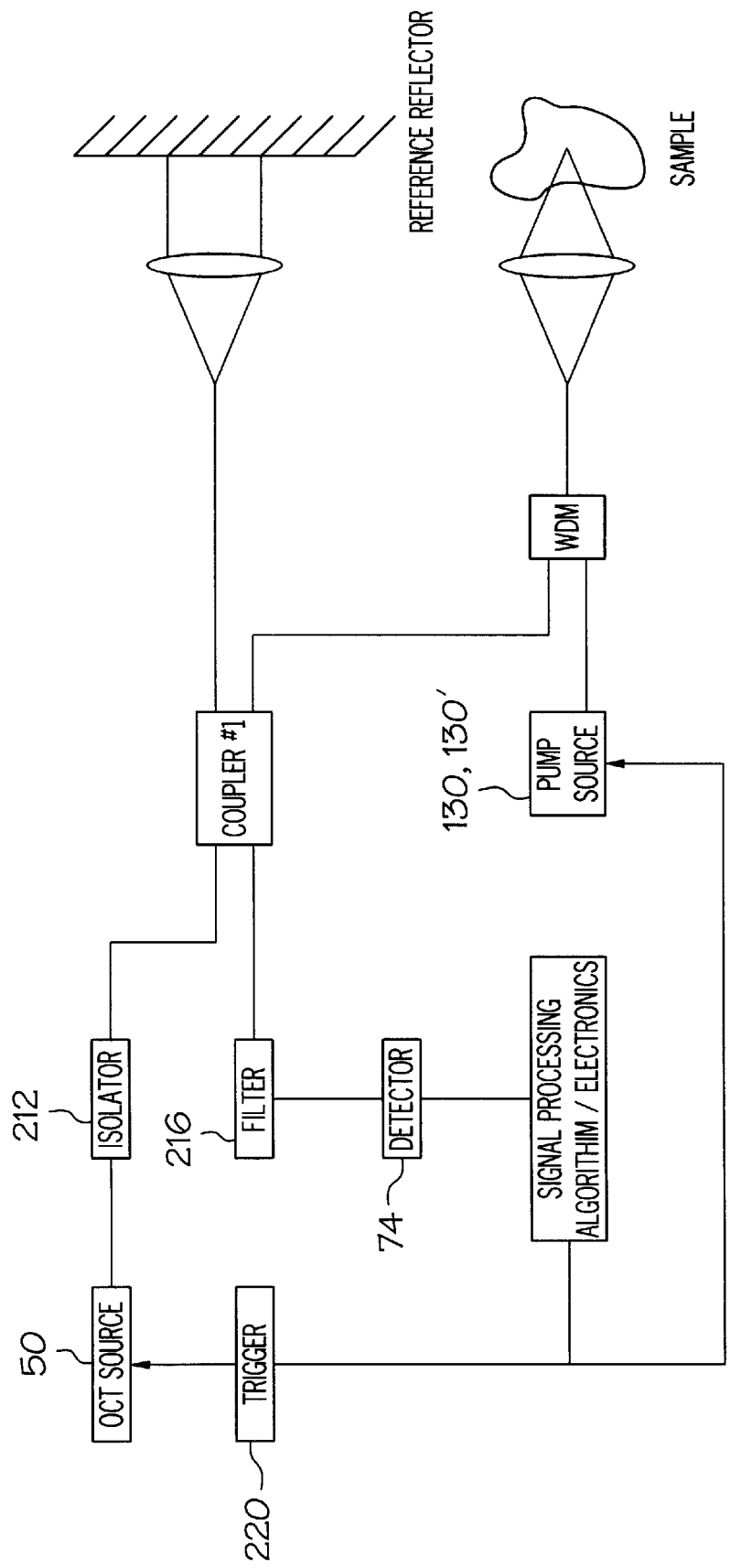
FIG. 11b is a schematic block diagram representation of an alternate data acquisition and signal processing system of the present invention.

FIG. 11b depicts the coaxial combination of the pump and probe light in the case of a fiber optic OCT system, in which all of the extra elements are present in their fiber optic implementation but have the same role as their counterparts in the bulk optic system of FIG. 11a. In this case, the fiber optic version of the dichroic implementation of beamsplitter #2 is know as a wavelength division multiplexer (WDM). FIG. 11c illustrates the case in which the pump laser light and the OCT probe light are not delivered to the sample coaxially, but rather are delivered through either the same or separate optical focusing systems in such a way that they arrive with an angle θ between them. This arrangement may be used when the coaxial system of FIGS. 11a and 11b is not practical, or else when a specific angle between the pump and probe beams is required to meet a phase matching condition.

Figure 12A:
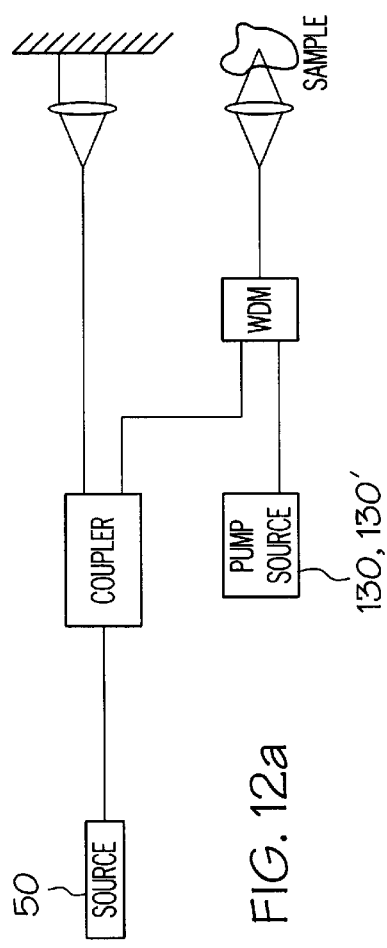
FIGS. 12a–e is a schematic block diagram representation of an alternate data acquisition and signal processing system of the present invention, including example diagrams representing signals obtained by the system.
Figure 12C:
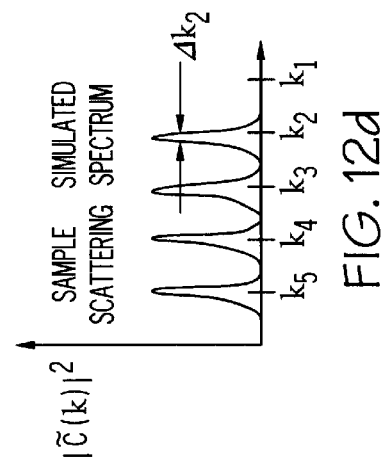
Figure 12D:
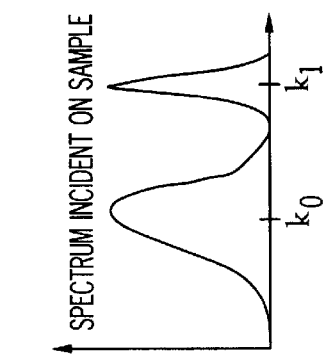
Figure 12B:
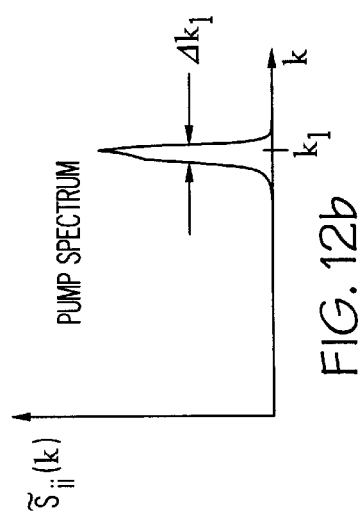
Figure 12E:
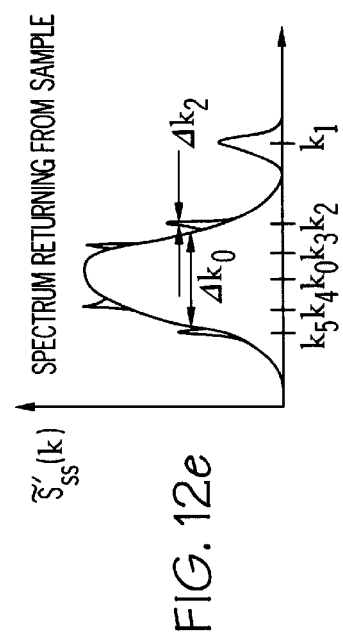

The concept and process of SC-SPOCT is illustrated schematically in FIG. 12a–12e. OCT probe light 50 with a source spectrum given by $\tilde{S}_{ii}(k)$ is incident in the source arm of the SC-SPOCT interferometer. This light may have an arbitrary spectral shape, but it is characterized by a center spatial frequency $k_0$ and a full-width-half-maximum (FWHM) spectral bandwidth $\Delta k_0$. Light from the pump source 130 which is incident on the second beam splitter is also characterized by its center frequency $k_1$ and FWHM spectral bandwidth $\Delta k_1$. In the preferred embodiment of SC-SPOCT, $\Delta k_1$ will be much narrower than $\Delta k_0$, and in fact $\Delta k_1$ will set the maximum spectral resolution with which the stimulated coherent scattering features of the sample will be resolved. The spectrum of light incident on the sample will thus be a superposition of the source and pump spectra, as illustrated in the figure. The sample is characterized by its own intrinsic stimulated scattering spectrum $\tilde{C}(k)^2$ which is a function of the pump wavelength $k_1$ and the internal atomic/molecular makeup of the sample. In the example of FIG. 12d, the stimulated scattering spectrum is characterized by several separate coherent scattering peaks corresponding to internal electronic or vibrational/rotational transitions of the atoms and molecules within the sample, each peak having its own center frequency and spectral bandwidth. In the case of stimulated emission SPOCT, the stimulated scattering spectrum will reflect electronic energy states comprising the fluorescence spectrum of the sample having been stimulated with light at the spatial frequency $k_0$. In this case, the stimulated scattering peaks will be quite broad (typically several hundred nanometers bandwidth in the wavelength units typically used in atomic spectroscopy), in many cases as broad or broader than the spectral bandwidth of the OCT probe source itself. In the case of stimulated Raman scattering, the stimulated scattering spectrum will reflect the Raman spectrum of the sample as a function of the frequency offset from the excitation frequency $k_1$, and the bandwidth of the peaks will typically be on the order of single $cm^{-1}$ to tens of $cm^{-1}$, in the spatial frequency units typically used in molecular spectroscopy.

As illustrated in FIGS. 12a–12e, the pump laser beam at frequency $k_1$ will induce a gain with frequency dependence given by $\tilde{C}(k)^2$ in the sample, and thus the light collected by the sample arm optics the sample will contain a combination of elastically and inelastically scattered light whose composite spectrum will appear as illustrated. This composite spectrum will have the overall shape of the source spectrum, however for those frequencies in the stimulated spectrum of the sample $\tilde{C}(k)^2$ which overlap the source spectrum, stimulated gain will lead to alterations in the collected spectrum reflecting the frequency-dependent gain of the sample. The stimulated spectrum of the sample $\tilde{C}(k)^2$ and the power spectrum of the light returning from the sample $\tilde{S}_{ss}(k)$ may both be recovered as a function of depth in the sample using the methods described in the previous sections of this disclosure.

In general, the spectrum of light returning from the sample $\tilde{S}_{ss}(k)$ and the sample backscatter spectrum estimate $\tilde{C}(k)^2$ will include alterations due to the elastic basckscatter spectrum of the sample as well as due to stimulated scattering processes. Methods for isolating the stimulated scattering spectrum with high sensitivity by using gated or synchronous detection are described in the next paragraph. Assuming that the alterations to the backscatter spectrum are either small compared to alterations due to stimulated coherent scattering, or else have been otherwise removed, a method for extracting a quantitave parameter for the stimulated scattering spectrum from estimates of $\tilde{S}_{ss}(k)$ is next described. Here we extend the notation for $\tilde{S}_{ss}(k)$ to $\tilde{S}_{ss}(l,k)$ to denote the sample arm power spectrum estimated at a distance into the sample of l. We denote the frequency-dependent gain of the sample at a depth l as $\tilde{G}(l,k)$, and note that for stimulated coherent scattering processes the sample arm light will experience exponential gain between any two depths $l_1$ and $l_2$ in the sample as a function of $\tilde{G}(l,k)$ and the round-trip propagation distance $l_2-l_1$:

$$\tilde{S}_{ss}(l_2,k)=\tilde{S}_{ss}(l_1,k)\cdot\exp[2\tilde{G}(l_1:l_2,k)\cdot(l_2-l_1)]. \quad (AA)$$

Here $\tilde{G}(l_1:l_2,k)$ denotes the stimulated scattering gain specified over the depth range from $l_1$ to $l_2$.

Figure 13:
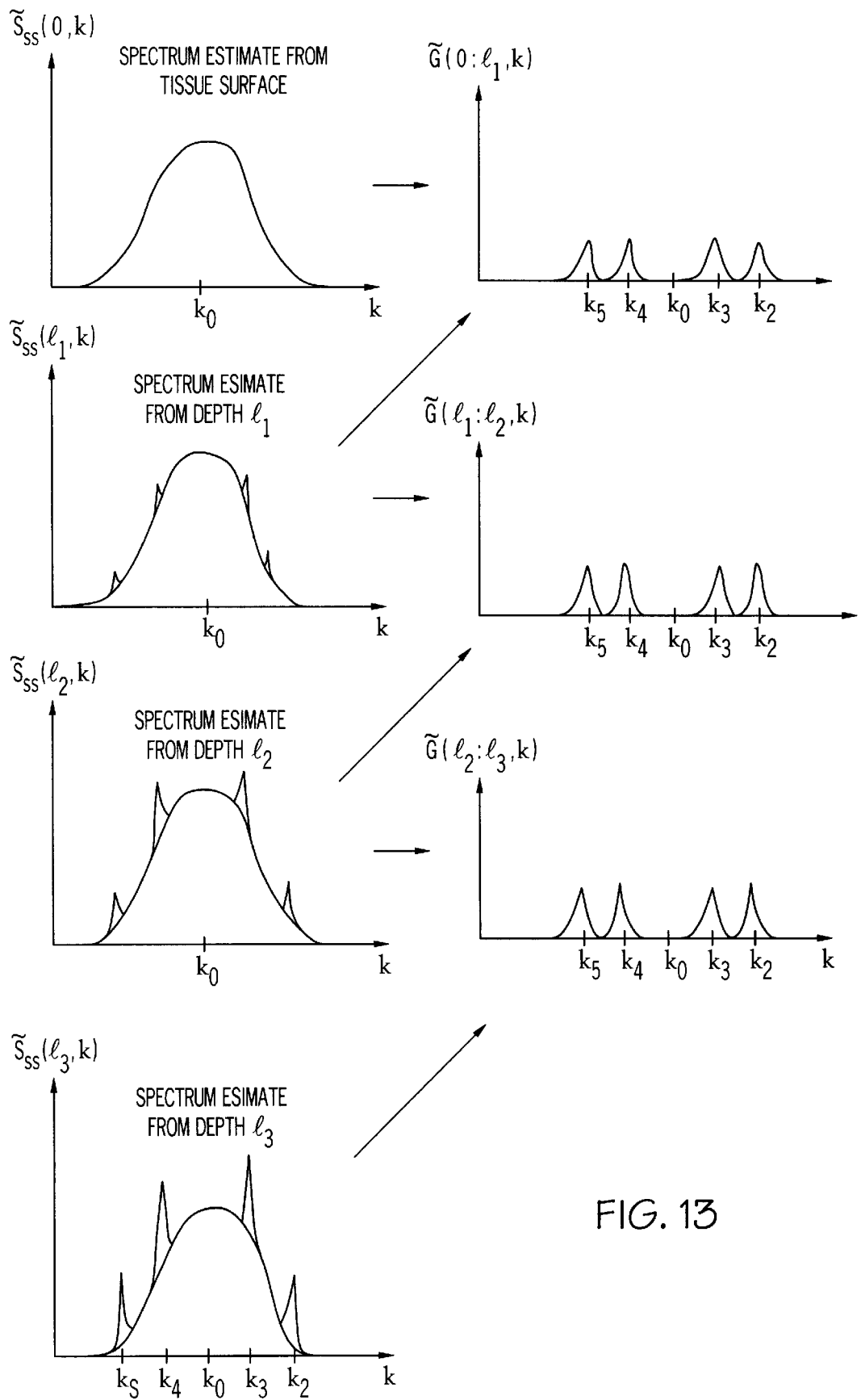

FIG. 13 illustrates how the SC-SPOCT sample arm power spectrum will be modified as a function of propagation depth in a sample with stimulated scattering. Estimates of $\tilde{G}(l_1:l_2,k)$ may be obtained from estimates of $\tilde{S}_{ss}(l,k)$ by solving equation AA:

$$\tilde{G}(l_1:l_2,k) = \frac{1}{(l_2-l_1)} \mathrm{Ln}\left[\frac{\tilde{S}_{ss}(l_2,k)}{\tilde{S}_{ss}(l_1,k)}\right]. \quad (BB)$$

The actual stimulated coherent gain experienced in tissues in most cases will be very small, perhaps altering the sample arm power spectrum by as little as 1 part in $10^3$ or even 1 part in $10^6$. In addition, as mentioned above, the stimulated scattering spectral alterations will occur in addition to spectral alterations due to elastic backscatter. It would thus be very desirable to have a method to isolate very small stimulated coherent alterations.

Methods for using gated or synchronous detection to achieve this objective are illustrated in FIGS. 14a–b and 15a–b. The underlying idea of these methods is to employ modulation of the pump light source power to modulate only those component of the estimated sample arm power spectrum which are due to stimulated scattering effects.

Figure 14A:
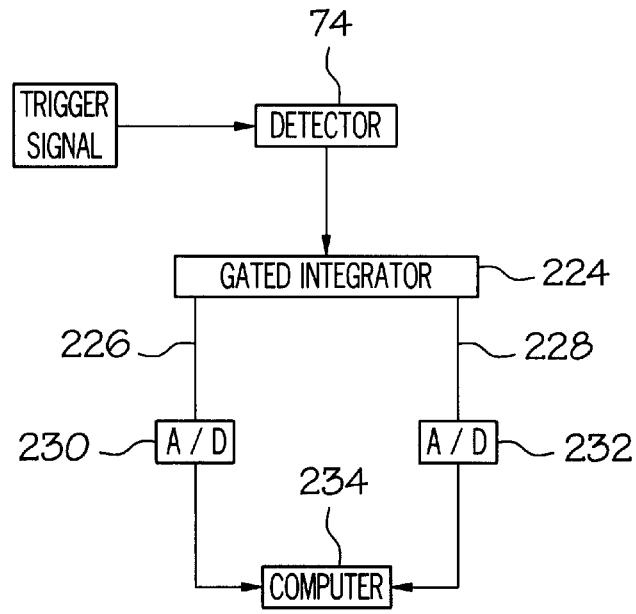
Figure 14B:
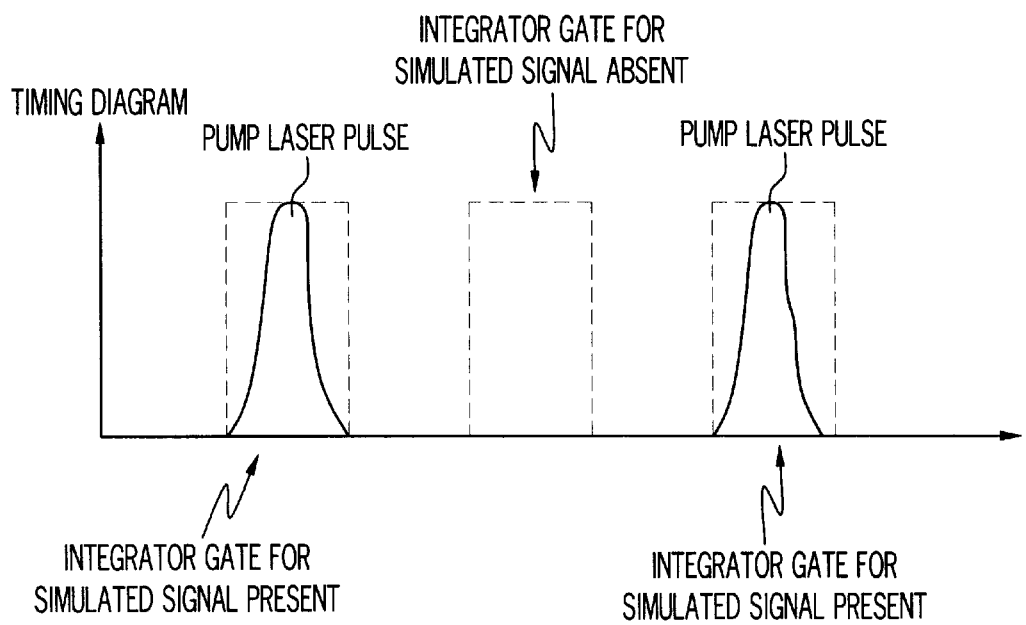

Gated detection of stimulated coherent scattering is illustrated schematically in FIG. 14a. For gated detection, a pulsed pump laser is used. The pump laser light may be pulsed either by using a Q-switched or mode-locked laser. Gated detection is the optimal detection method for stimulated coherent scattering processes for which the stimulated gain coefficient $\tilde{G}(l,k)$ is a function of the pump laser intensity, i.e. for nonlinear optical processes such as stimulated Raman scattering. For higher-order nonlinear optical stimulated scattering processes, it may also be advantageous to use a pulsed OCT probe source synchronized to the pump laser pulse frequency, such as the broadband output of a femtosecond mode-locked laser. In gated detection, the pump laser is triggered by a timing trigger source which may be either a separate system trigger, or may be a part of the pump laser pulse electronics. The detector 74 output is then processed by a gated integrator device 224, which integrates the detector output only for the duration of a gate which is set to coincide with the laser pulse duration. The gated integrator outputs a signal 226 representing the average of the signal detected during the gate, optionally additionally averaged over many separate laser pulses. The gated integrator also outputs a signal 228 proportional to the average of the signal detected during a separate gate signal when the pump laser is not on, also optionally averaged over many separate such gates. These two outputs are then digitized in A/D converters 230, 232, one or more times per coherence length of travel of the reference arm of the SC-SPOCT interferometer. In the computer 234, these digitized values are processed (using the methods described above) to generate estimates of $\tilde{C}(k)^2$ and/or $\tilde{S}_{ss}(l,k)$ both with and without the pump laser on. The estimate of $\tilde{C}(l,k)$ and/or $\tilde{S}_{ss}(l,k)$ obtained with the laser on is subtracted from the estimate obtained with the laser off, generating a high sensitivity measurement of $\tilde{C}(k)^2$ and/or $\tilde{S}_{ss}(l,k)$ due only to coherent scattering processes which is insensitive to the elastic backscatter spectrum.

Figure 15A:
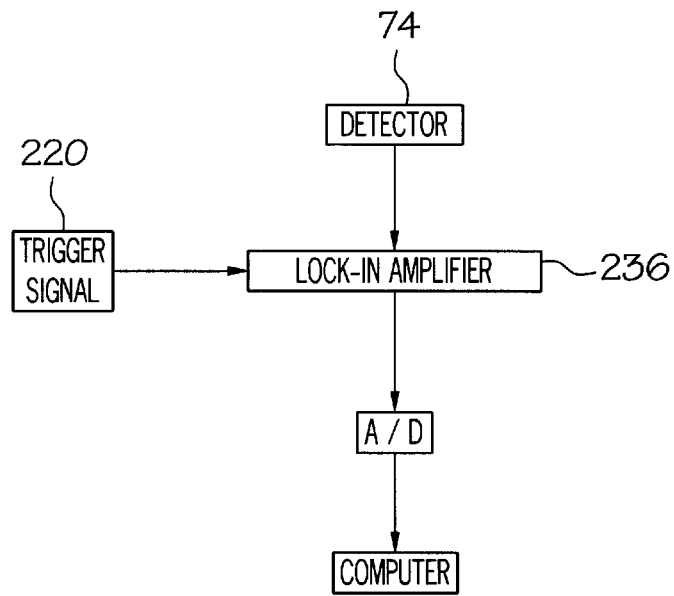
Figure 15B:
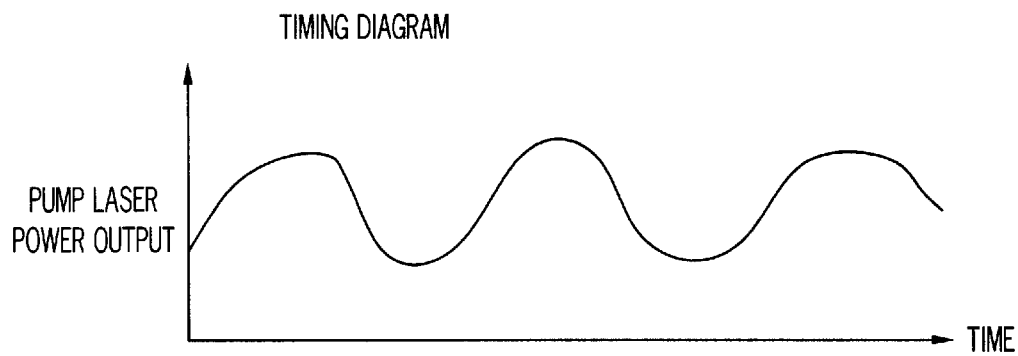
Figure 15C:
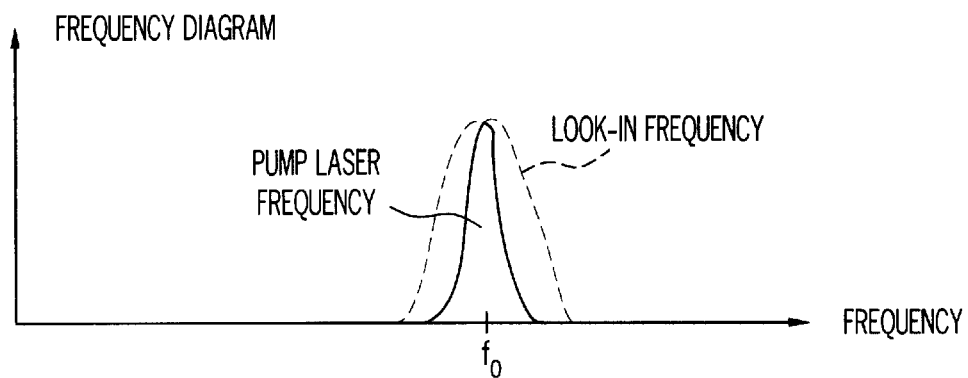

Synchronous detection of stimulated coherent scattered light is illustrated in FIG. 15a–b. In synchronous detection, the intensity of the pump laser light is modulated at a frequency $f_0$. Modulation of the pump laser light may be accomplished either sinusoidally by modulating the pump laser power supply, or optically by use of electro-optic or acousto-optic modulation. Alternatively, the pump laser light may be modulated with a square wave amplitude profile by use of an optical chopper. In synchronous detection, the detector 74 signal and a trigger 220 signal with a fixed phase relationship to the pump laser modulation are provided as signal and reference inputs, respectively, to a lock-in amplifier 236. The lock-in amplifier 236 outputs a signal proportional to the content of the detector signal which is modulated at the same frequency as and is in phase with the pump laser modulation. The lock-in amplifier output is digitized one or more times per coherence length of travel of the reference arm, and estimates of $\tilde{C}(k)^2$ and/or $\tilde{S}_{ss}(l,k)$ both with and without the pump laser on are obtained as for gated detection.

IX. Stimulated-Emission Spectroscopic Optical Coherence Tomography (SE-SPOCT)

Stimulated emission spectroscopic optical coherence tomography (SE-SPOCT) is a specific implementation of stimulated coherent spectroscopic OCT which obtains a depth-resolved stimulated emission spectrum of a sample. SE-SPOCT may be used to image uptake of high quantum efficiency laser dyes or infrared-emitting exogenous fluorescent probes into biological specimens. Examples of the latter include probes for measurement of intra-cellular pH (e.g. carbocyanine, with an excitation maximum at 780 nm and an emission maximum at 795 nm), and nucleic acids (e.g. IR-132, with its excitation maximum at 805 nm and its emission maximum at 835 nm). A suitable pump laser 130 for use with such dyes includes a 780 nm nanosecond-pulsed fiber-coupled diode laser. When such a pump laser is utilized, an 830 nm superluminescent diode is used as the OCT probe source 50. Another pump laser 130 suitable for use with these or other infrared-emitting fluorescent species is a Nd:YAG-pumped dye laser. When such a pump laser is utilized, a modelocked Ti:Al$_2$O$_3$ laser may be used as a very broadband OCT probe source 50. The latter combination of pump and probe sources forms a broadly tunable system capable of detecting both depth- and frequency-dependent gain in a range of clinically viable probes.

X. Raman Scattering Spectroscopic OCT(SRS-SPOCT)

Similar to SE-SPOCT, the present invention also provides a system or method for performing stimulated Raman scattering spectroscopic OCT (SRS-SPOCT). In this embodiment, the system or method includes the means for, or the step of directing a high intensity pump light into the sample interaction region. Resonant gain experienced by the low-coherence probe light will appear as localized peaks in the depth-resolved backscatter spectrum of the sample. The SC-SPOCT concept is well suited to Raman spectroscopy since SRS spectra have sharp spectral features, and can be obtained in any desired wavelength range by selection of the pump laser frequency. Thus substantial vibrational/ rotational spectral information can be collected using relatively narrow bandwidth OCT probe sources. In addition, coherent detection of Raman signals avoids incoherent fluorescent noise typical of other systems. Although SRS signals have not previously been observed in turbid media, coherent Raman gain spectroscopy has been demonstrated with low-power (including cw) laser sources using nonlinear interferometry.

SRS-SPOCT may be implemented using a modelocked, Q-switched Nd:YAG laser operating at 1060 nm as a pump source and a femtosecond Cr:Forsterite laser with a bandwidth extending from 1250 nm–1350 nm as the SPOCT probe. Assuming SRS gain cross sections typical of organic solvents, modelocked peak pump powers of ~1 MW focused to the OCT probe beam spot size will be sufficient to generate ~1% stimulated Raman gain over a 100 $\mu$m window depth in samples. The wavenumber shift available for depth-resolved spectral acquisition with this SRS-SPOCT implementation will encompass 1100–2000 $cm^{-1}$, including most of the "fingerprint region" used in previous Raman spectroscopy studies of biological media. Many biological molecules have Raman shifts in this range, including proteins with Amide I (1645–1680 $cm^{-1}$) and Amide III (1225–1300 $cm^{-1}$) bands which can be used to characterize the $\alpha$-helix, $\beta$ pleated sheet and disordered protein conformations, and DNA base vibrations (1100–1700 $cm^{-1}$) which can be used to differentiate B and Z conformations. SRS-SPOCT can be used to probe the structure of nuclear proteins and DNA, as well as the cytoplasmic and extracellular protein structure in human tissues.

XI. Conclusion

While describing the present invention, we talk about the scanning Michelson interferometer where the reference arm length is mechanically scanned by translating the reference mirror. It is to be understood that the inventions described herein are applicable to any interferometric device which estimates the correlation functions described above. The deconvolution algorithms are also applicable to any device which measures the auto-power spectra and cross-power spectra. Thus, the present invention is applicable to any device capable of measuring any of the above mentioned quantities whether the device operates in free space or is fiber optically integrated. Also, the present invention is equally applicable in situations where a measuring device is coupled to an endoscope or a catheter or any other diagnostic instrument.

The transfer function was described above as a function of spatial frequency (i.e., wavenumber k=2p/l,l is wavelength in the medium). It is to be understood that the transfer function can also be estimated using our methods as a function of optical frequency f'. Note that f' can be related to k by f'=ck/(2p) where c is phase velocity in the medium at that wavenumber. Also, it is obvious that the transfer functions can also be expressed as a function of w=2pf' or $k_1$=1/l.

Although a low temporal coherence source is useful in making the measurements in OCDR and OCT, it is to be understood that a high temporal coherence source can also be used with the spectroscopy methods of the present invention.

Having described the invention in detail and by reference to the drawings, it will be apparent that modification and variations are possible without departing from the scope of the invention as defined in the following claims.

What is claimed is:

1. A method for determining depth-resolved backscatter characteristics of scatterers within a sample, comprising the steps of:

acquiring a plurality of sets of cross-correlation interferogramn data using an interferometer having a sample arm with the sample in the sample arm, wherein the sample includes a distribution of scatterers therein, and wherein the acquiring step includes the step of altering the distribution of scatterers within the sample with respect to the sample arm for substantially each acquisition; and averaging, in the Fourier domain, the cross-correlation interferogram data, thereby revealing backscattering characteristics of the scatterers within the sample.

2. The method of claim 1, wherein the averaging, in the Fourier domain, step includes the steps of:

calculating a transfer function for each set of cross-correlation interferogram data acquired; and squaring the magnitude of each transfer function; and averaging the squared magnitudes.

3. The method of claim 2, wherein the transfer function calculating step includes the steps of:

acquiring auto-correlation interferogram data for the interferometer;

generating, from the auto-correlation interferogram data, an auto-power spectrum;

generating, from the set of cross-correlation interferogram data, a cross-power spectrum; and obtaining a ratio of the cross-power spectrum to the auto-power spectrum.

4. The method of claim 1, wherein the step of altering the distribution of scatterers within the sample with respect to the sample arm includes the step of physically altering the distribution of scatterers within the sample.

5. The method of claim 1, wherein the step of altering the distribution of scatterers within the sample with respect to the sample arm includes the step of repositioning the sample arm.

6. The method of claim 1, further comprising the step of comparing the backscattering characteristics with control data to diagnose abnormalities or disease within the sample.

7. The method of claim 6, further comprising the steps of incorporating a sample probe of the interferometer into an endoscope or surgical instrument, and scanning the endoscope or surgical instrument along a portion of a patient's gastrointestinal tract tissue to diagnose abnormalities or disease within the patient's gastrointestinal tract tissue, wherein the control data includes data corresponding to backscattering characteristics of relatively normal gastrointestinal tract tissue.

8. The method of claim 1, wherein the acquiring cross-correlation interferogram data step or the averaging step includes the step of controlling the depth over which cross-correlation interferogram data is averaged.

9. The method of claim 8, wherein the interferometer includes a reference arm and the controlling step includes the step of limiting a scan length of the reference arm to an area of interest in the sample.

10. The method of claim 8, wherein the controlling step includes the step of windowing the cross-correlation interferogram data to an area of interest in the sample.

11. The method of claim 1, wherein the interferometer includes a reference arm and the method further comprises the step of monitoring reference arm path length, wherein the acquisition step includes the step of compensating for velocity fluctuations detected during the monitoring step.

12. The method of claim 1, further comprising the step of directing an intense pump laser to the sample, whereby the revealed backscattering characteristics will contain features corresponding to inelastic backscattering characteristics of the scatterers within the sample.

13. A method for determining depth-resolved backscatter characteristics of scatterers within a sample, comprising the steps of:

acquiring auto-correlation data from a low-coherence source interferometer, the low-coherence source interferometer including a sample arm;

acquiring multiple cross-correlation data from the low-coherence source interferometer, wherein the low-coherence source interferometer includes a sample in its sample arm;

obtaining an auto-power spectrum for a windowed portion of the auto-correlation data;

obtaining a cross-power spectrum for a windowed portion of each cross-correlation data;

obtaining a transfer function for each cross-correlation data by taking a ratio of the windowed cross-power spectrum to the auto-power spectrum;

squaring each transfer function; and averaging the magnitude of the squared transfer functions.

14. An optical coherence tomography system comprising:

an interferometer including an optical radiation source and a sample arm, the interferometer generating a plurality of cross-correlation data outputs for a sample in the sample arm; and a data processing system, operatively coupled to an output of the interferometer, averaging the cross-correlation data outputs, in the Fourier domain, to reveal backscattering characteristics of scatterers within the sample.

15. The optical coherence tomography system of claim 14, further comprising a database containing control data for comparison against the backscattering characteristics of scatterers within the sample.

* * * * *